United States Patent
He et al.

(10) Patent No.: US 9,323,338 B2
(45) Date of Patent: Apr. 26, 2016

(54) INTERACTIVE INPUT SYSTEM AND METHOD

(71) Applicant: USENS, INC., San Jose, CA (US)

(72) Inventors: Anli He, San Jose, CA (US); Yue Fei, San Jose, CA (US)

(73) Assignee: USENS, INC., San Jose, CA (US)

( * ) Notice: Subject to any disclaimer, the term of this patent is extended or adjusted under 35 U.S.C. 154(b) by 140 days.

(21) Appl. No.: 14/034,286

(22) Filed: Sep. 23, 2013

(65) Prior Publication Data

US 2014/0306875 A1 Oct. 16, 2014

Related U.S. Application Data

(60) Provisional application No. 61/841,864, filed on Jul. 1, 2013, provisional application No. 61/811,680, filed on Apr. 12, 2013.

(51) Int. Cl.
*G09G 5/00* (2006.01)
*G06F 3/01* (2006.01)
*G06F 3/042* (2006.01)

(52) U.S. Cl.
CPC ............. *G06F 3/017* (2013.01); *G06F 3/013* (2013.01); *G06F 3/0425* (2013.01)

(58) Field of Classification Search
CPC ....... G06F 3/011; G06F 3/017; G06F 3/0425; G06F 3/04842; G06F 3/0346
USPC .................. 345/156–158, 173; 715/700–866
See application file for complete search history.

(56) References Cited

U.S. PATENT DOCUMENTS

| | | | |
|---|---|---|---|
| 7,023,536 B2 | 4/2006 | Zhang et al. | |
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,474,809 B2 | 1/2009 | Carl | |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 8,542,219 B2 | 9/2013 | Carl et al. | |
| 8,553,935 B2 | 10/2013 | Mandella et al. | |
| 8,659,592 B2 * | 2/2014 | Wang | G06T 7/0081 345/419 |
| 8,723,789 B1 * | 5/2014 | Rafii | 345/156 |
| 8,897,494 B2 | 11/2014 | Mandella et al. | |
| 8,970,709 B2 | 3/2015 | Gonzalez-Banos et al. | |
| 9,189,856 B1 | 11/2015 | Gonzalez-Banos et al. | |
| 9,229,540 B2 | 1/2016 | Mandella et al. | |
| 9,235,934 B2 | 1/2016 | Mandella et al. | |
| 2010/0303303 A1 * | 12/2010 | Shen et al. | 382/107 |
| 2016/0063706 | 3/2016 | Gonzalez-Banos et al. | |

* cited by examiner

*Primary Examiner* — Jennifer Nguyen
(74) *Attorney, Agent, or Firm* — Finnegan, Henderson, Farabow, Garrett & Dunner, LLP

(57) ABSTRACT

A method for three-dimensional (3D) sensing. The method includes obtaining a first two-dimensional (2D) skeleton of an object, obtaining a second 2D skeleton of the object different from the first 2D skeleton, and calculating a 3D skeleton of the object based on the first and second 2D skeletons.

16 Claims, 37 Drawing Sheets

Non-depolarizing material coating

Coating

Background surface

Non-depolarizing material coating with color die/micro particles

Coating

Background surface

900

2D skeleton lines from 2 imaging sensors

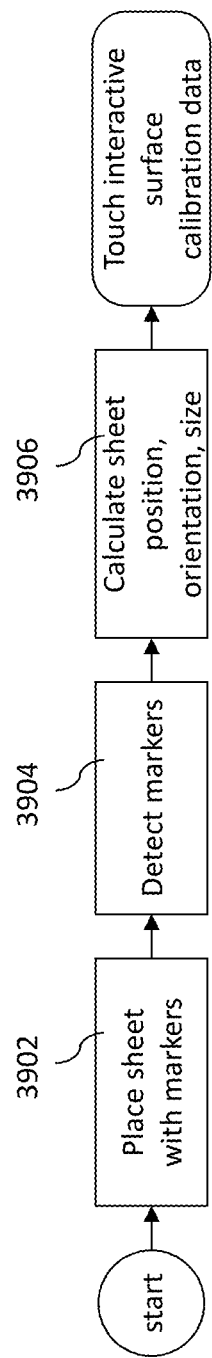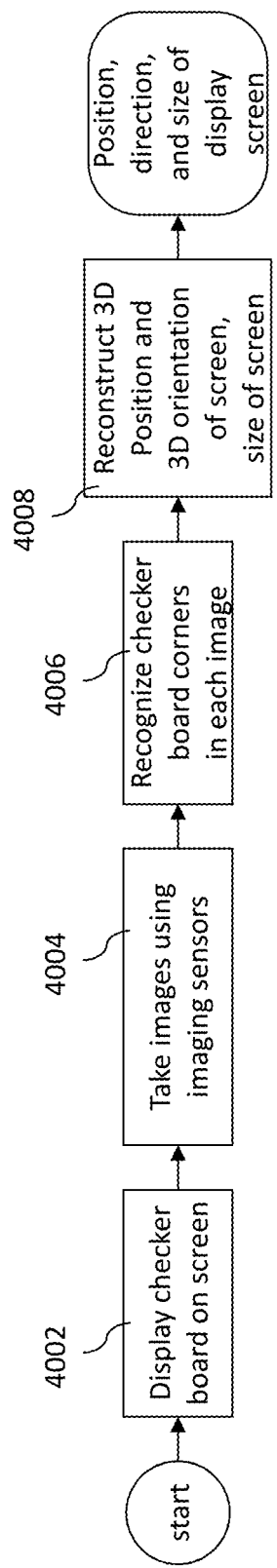

INTERACTIVE INPUT SYSTEM AND METHOD

CROSS REFERENCE TO RELATED APPLICATIONS

This application is based upon and claims the benefit of priority from Provisional Application No. 61/811,680, filed on Apr. 12, 2013, and Provisional Application No. 61/841,864, filed on Jul. 1, 2013, the entire contents of both of which are incorporated herein by reference.

TECHNOLOGY FIELD

The disclosure relates to input systems and methods and, more particularly, to input systems and methods based on detection of three-dimensional (3D) motion of a 3D object.

BACKGROUND

A computer user often needs to interact with the computer, which may be realized using an interactive input device, such as a keyboard, a mouse, or a touch screen. However, there are limits in using these devices. For example, conventional touch screens usually are based on technologies such as, for example, capacitive sensing or electric-field sensing. Such technologies can only track objects, such as the user's fingers, near the screen (that is, a short operational range), and cannot recognize the objects' 3D structure. Moreover, touch screens are usually used in small computers such as table computers. For a larger computer, such as a desktop or a workstation, it is often not convenient for the user to reach to the screen.

Therefore, there is a need for a human-computer interactive input system that has a larger operational range, is accurate and fast to resolve fine objects, such as a user's fingers, and has the ability to track an object's 3D motion and interaction with a surface.

SUMMARY

In accordance with the disclosure, there is provided a method for three-dimensional (3D) sensing. The method includes obtaining a first two-dimensional (2D) skeleton of an object, obtaining a second 2D skeleton of the object different from the first 2D skeleton, and calculating a 3D skeleton of the object based on the first and second 2D skeletons.

Also in accordance with the disclosure, there is provided a non-transitory computer-readable storage medium storing a program for three-dimensional (3D) sensing. The program, when executed by a computer, instructs the computer to obtain a first two-dimensional (2D) skeleton of an object, obtain a second 2D skeleton of the object different from the first 2D skeleton, and calculate a 3D skeleton of the object based on the first and second 2D skeletons.

Further in accordance with the disclosure, there is provided an apparatus for three-dimensional (3D) sensing. The apparatus includes a first camera capturing a first 2D image of an object from a first viewing angle, a second camera capturing a second 2D image of the object from a second viewing angle different from the first viewing angle, and a processor. The process is configured to extract a first two-dimensional (2D) skeleton of the object from the first 2D image, extract a second 2D skeleton of the object from the second 2D image, and calculate a 3D skeleton of the object based on the first and second 2D skeletons.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 39 is a flow chart showing a process for automatically detecting a touch interactive surface by detecting markers according to an exemplary embodiment.

FIG. 40 is a flow chart showing a process for automatically detecting and calibrating a display screen according to an exemplary embodiment.

DESCRIPTION OF THE EMBODIMENTS

Embodiments consistent with the disclosure include an interactive input system and a method for interactive input.

Hereinafter, embodiments consistent with the disclosure will be described with reference to drawings. Wherever possible, the same reference numbers will be used throughout the drawings to refer to the same or like parts.

Figure 1:
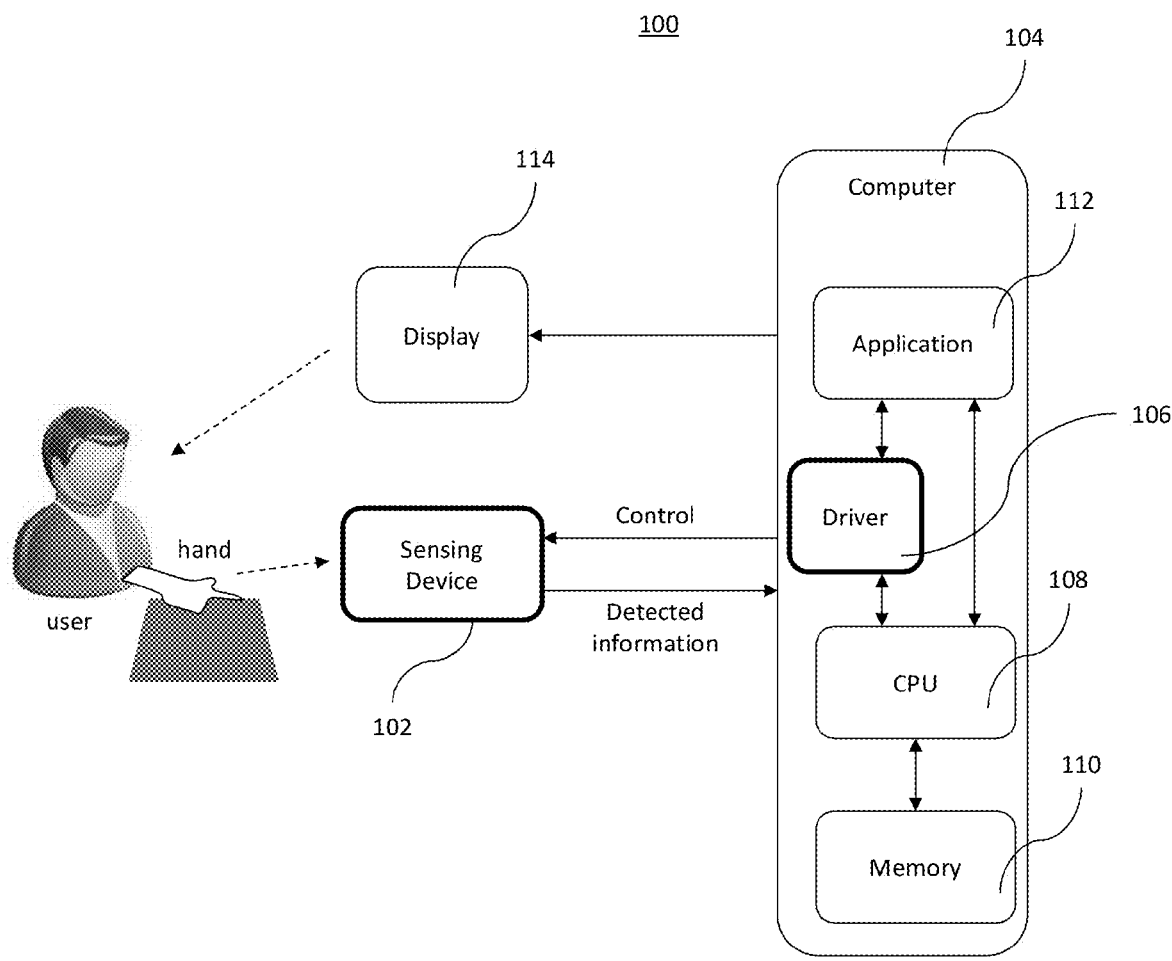
FIG. 1 schematically shows an interactive system according to an exemplary embodiment.

FIG. 1 schematically shows an interactive system 100 consistent with embodiments of the disclosure. The interactive system 100 includes a sensing device 102 and a computer 104. The sensing device 102 is configured to sense the motion of an object and transfer the detected information to the computer 104, via a sensing device driver 106 installed on the computer 104. The object may be, for example, a hand or a finger of a user. The detected information may include, for example, the three-dimensional (3D) position, orientation, or moving direction of the object, or information about the object's touching on or hovering over another object, such as a surface. The sensing device driver 106 reads the output, i.e., the detected information, of the sensing device 102, processes the detected information, and outputs tracking results, such as 3D tracking results. The sensing device driver 106 also controls the operation of the sensing device 102.

The computer 104 may include other components, such as a CPU 108 and a memory 110. Other applications, such as application 112, may also be installed on the computer 104. The computer 104 is also connected to a display 114, which may be used to graphically show the tracking results output by the sensing device 102.

Figure 2:
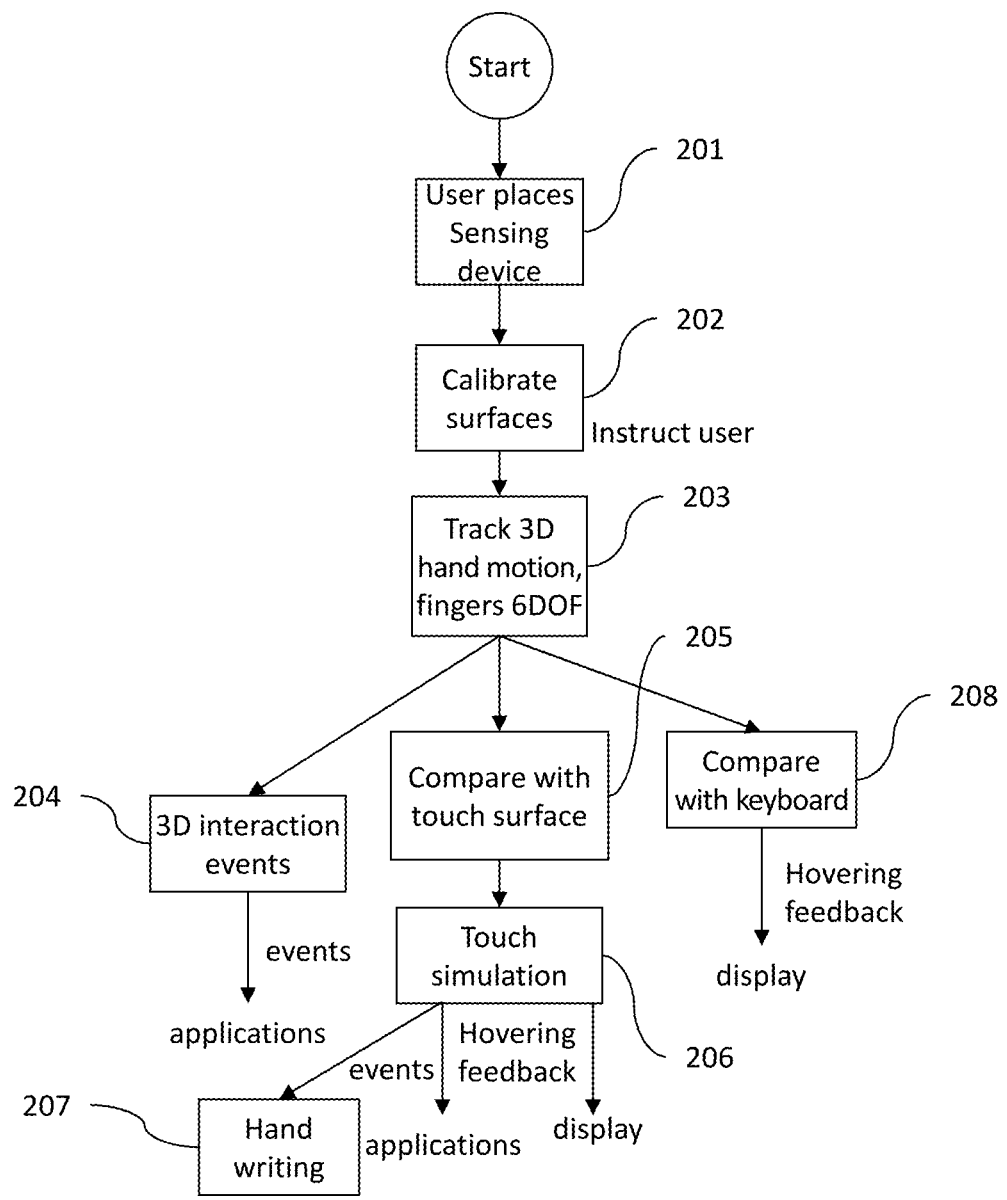
FIG. 2 is a flow chart showing a process according to an exemplary embodiment.

FIG. 2 is a flow chart showing an exemplary process consistent with embodiments of the disclosure. In the exemplary process shown in FIG. 2, the object being detected by the sensing device 102 is a user's hand.

At 201, the user places the sensing device 102 at a certain location. For example, the sensing device 102 may be placed on a table top and face up. The sensing device 102 may alternatively be mounted on the computer 104 or on the top of the display 114.

At 202, after the sensing device 102 is placed, the interactive system 100 begins the environment calibration process. In some embodiments, in the environment calibration process, the interactive system 100 detects background environment information, and calibrates a touch interactive surface. More details about the touch interactive surface will be described later in this disclosure. The environment calibration process may be fully automated to detect certain known environment objects, such as, for example, the display 114, a keyboard, or an optically marked touch pad. Alternatively, the environment calibration process may be manual. For example, the user may define an environment object as the touch interactive surface, or define a virtual plane, i.e., an imaginary plane not on any actual environment object, as the touch interactive surface. If the environment calibration process is manual, instructions may be displayed on, for example, the display 114, or may be delivered to the user in an audio format through, for example, a speaker (not shown).

At 203, during a normal usage period, the interactive system 100 continuously detects a foreground object, such as the user's hand or finger, and recognizes the foreground object's 3D structure and associated 3D movement. The interactive system 100 also detects changes in the background environment and recalibrates the background when needed.

At 204, the sensing device driver 106 translates the detected information into "3D interaction events" and sends the events to applications installed on and the operating system (OS) of the computer 104. For example, a 3D interaction event may be a 3D position, a 3D orientation, a size (such as length or width), and fine details of the foreground object, e.g., the user's hand or finger. The applications and the OS may change state according to the received events, and may update a graphical user interface (GUI) displayed on the display 114 accordingly.

At 205, the sensing device driver 106 compares the detected 3D position of the foreground object with the touch interactive surface, and determines object-to-surface information such as, for example, a distance between the foreground object and the surface, a projected two-dimensional (2D) position of the foreground on the surface. The sensing device driver 106 then converts the object-to-surface information to touch events, multi-touch events, or mouse events (206).

At 207, the sensing device driver 106 delivers the events to the applications or the OS, and translates the touch events into a hand writing process. Since the interactive system 100 can detect the foreground object's distance to and projected position on the touch interactive surface, before the foreground object actually touches the touch interactive surface, the interactive system 100 can predict a touch before the touch actually occurs, e.g., when the touch will occur and where on the touch interactive surface the touch will occur. The interactive system 100 can also determine and display a "hovering" feedback on the display 114.

At 208, the sensing device driver 106 compares the position of the foreground object with positions of the environment objects, such as positions of keys of a keyboard. The interactive system 100 may generate hovering feedback about which key the user will press before the user actually presses the key. In some embodiments, the interactive system 100 may display a virtual keyboard and such hovering feedback in a GUI on the display 114.

Consistent with embodiments of the disclosure, the sensing device 102 may be a stand-alone device separated from the computer 104 but can be coupled to the computer 104 via a wired connection (such as a USB cable) or a wireless connection (such as Bluetooth or WiFi). In some embodiments, the sensing device 102 may be integrated into the computer 104, i.e., may be part of the computer 104.

Consistent with embodiments of the disclosure, the sensing device 102 may include multiple imaging sensors, such as cameras. The imaging sensors may be visible light imaging sensors which are more responsive to visible light, or infrared (IR) imaging sensors which are more responsive to IR light. The sensing device 102 may also include one or more illumination sources, which provide illumination in various wavelengths according to the type of the imaging sensors. The illumination sources may be, for example, light-emitting diodes (LED's) or lasers equipped with diffusers. In some embodiments, the illumination sources may be omitted and the imaging sensors detects the environmental light reflected by an object or the light emitted by an object.

Figure 3A:
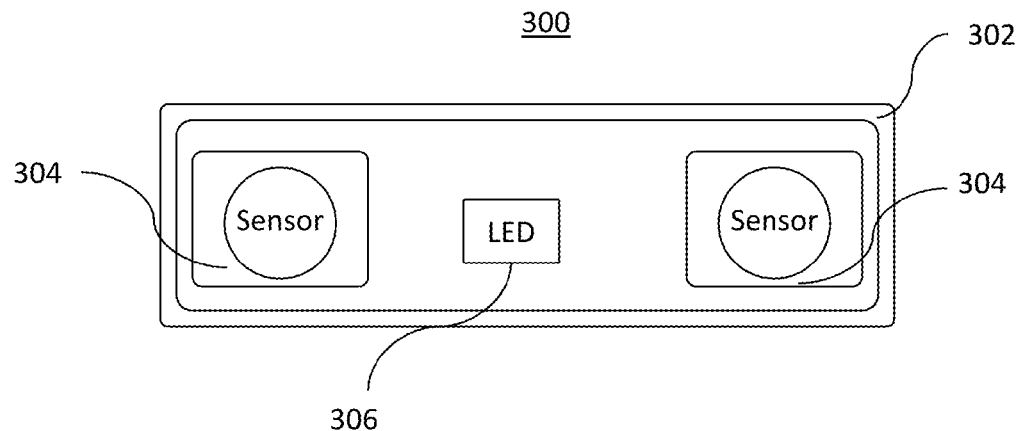
FIGS. 3A and 3B schematically show a sensing device according to an exemplary embodiment.
Figure 3B:
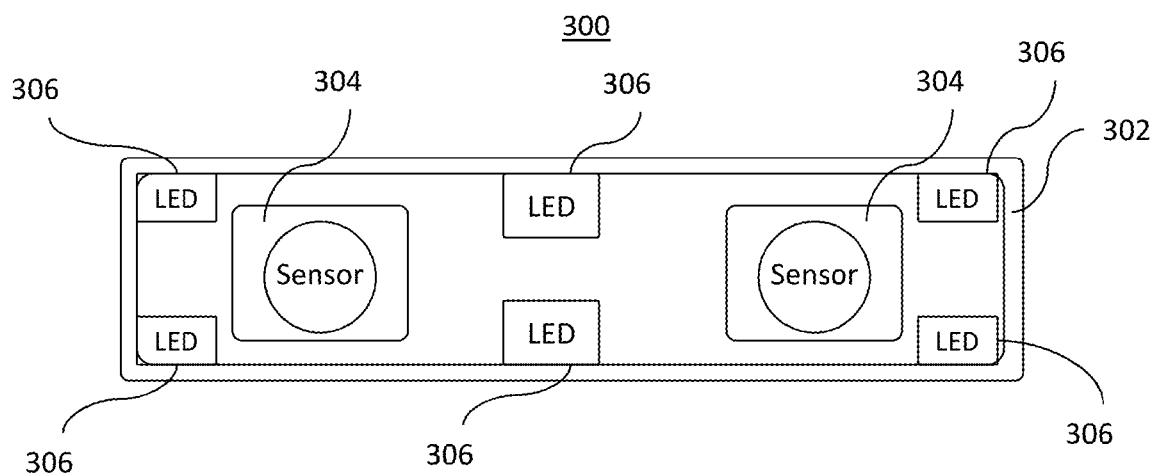

FIGS. 3A and 3B schematically show an exemplary sensing device 300 consistent with embodiments of the disclosure. The sensing device 300 includes a housing 302, multiple imaging sensors 304, and one or more illumination sources 306. The imaging sensors 304 and the one or more illumination sources 306 are all formed in or on the housing 302. Such a design is also referred to as a uni-body design in this disclosure.

The sensing device 300 shown in FIG. 3A has one (1) illumination source 306, while the sensing device 300 shown in FIG. 3B has six (6) illumination sources 306. In the example shown in FIG. 3A, the illumination source 306 is arranged between the imaging sensors 304, while in the example shown in FIG. 3B, the illumination sources 306 are evenly distributed on the housing 302 to provide better illumination results such as, for example, a wider coverage or a more uniform illumination. For example, as shown in FIG. 3B, two illumination sources 306 are located between the two imaging sensors 304, two illumination sources 306 are located on the left half of the housing 302, and two illumination sources 306 are located on the right half of the housing 302.

In the figures of the disclosure, LED's are illustrated as the illumination sources, as examples. As discussed above, other light sources, such as lasers equipped with diffusers, may also be employed.

In some embodiments, illumination within the IR bandwidth is needed. Such an illumination may be invisible to naked human eyes. In such embodiments, the illumination sources 306 may include, for example, LED's emitting IR light. Alternatively, the illumination sources 306 may include LED's emitting light with broader bands that may encompass visible light. In such situation, the illumination sources 306 may each be accompanied with an IR transmissive filter (not shown) placed, for example, in front of the corresponding illumination source 306.

In some embodiments, the sensing device 300 may also include an IR transmissive filter (not shown) placed in front of the imaging sensors 304 to filter out visible light. In some embodiments, the sensing device 300 may also include lens (not shown) placed in front of the imaging sensors 304 for focusing light. The IR transmissive filter may be placed in front of the lens, or between the lens and the imaging sensors 304.

Consistent with embodiments of the disclosure, the sensing device 300 may also include a controlling electronic circuit (not shown). The controlling electronic circuit may control the operation parameters of the imaging sensors 304, such as, for example, shutter duration or gain. The controlling electronic circuit may also control the synchronization between or among the multiple imaging sensors 304. Moreover, the controlling electronic circuit may control the illumination brightness of the illumination sources 306, the on/off or duration of the illumination from the illumination sources 306, or the synchronization between the illumination sources 306 and the imaging sensors 304. The controlling electronic circuit may also perform other functions such as, for example, power management, image data acquiring and processing, output of data to other devices, such as the computer 104, or receipt of commands from other devices, such as the computer 104.

In some embodiments, the sensing device 300 may further include one or more buttons configured to turn on/off or reset the sensing device 300, or to force recalibration of the environment. For example, one button may be configured to allow the user to forcibly start the manual calibration process to calibrate the touch interactive surface.

In some embodiments, the sensing device 300 may also include one or more indicator lights showing the state of the sensing device 300 such as, for example, whether the sensing device 300 is on or off, is performing the environment calibration, or is performing the touch interactive surface calibration.

Figure 4A:
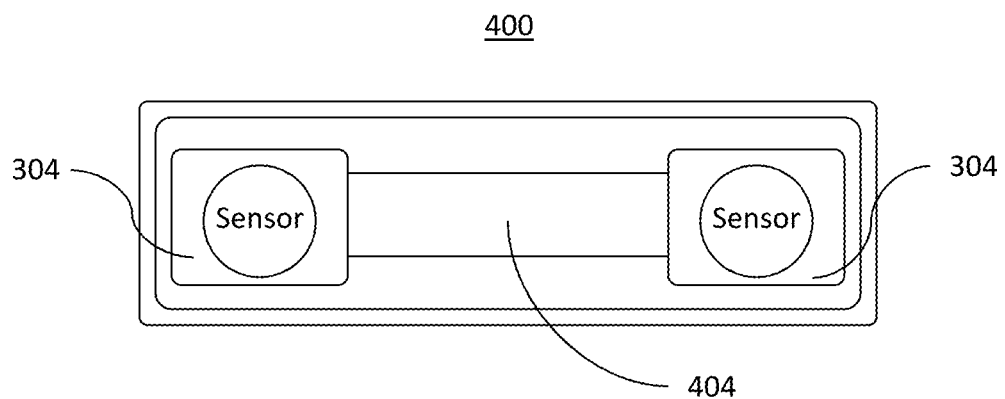
FIGS. 4A-4C schematically show a sensing device according to an exemplary embodiment.
Figure 4B:
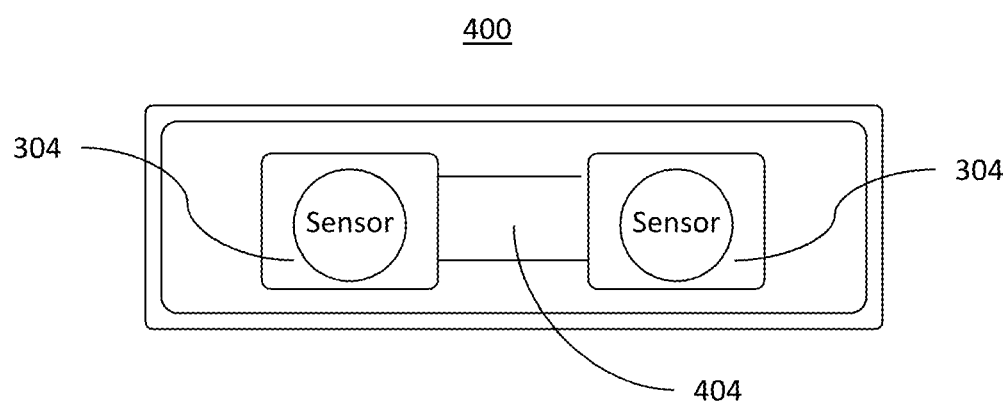
Figure 4C:
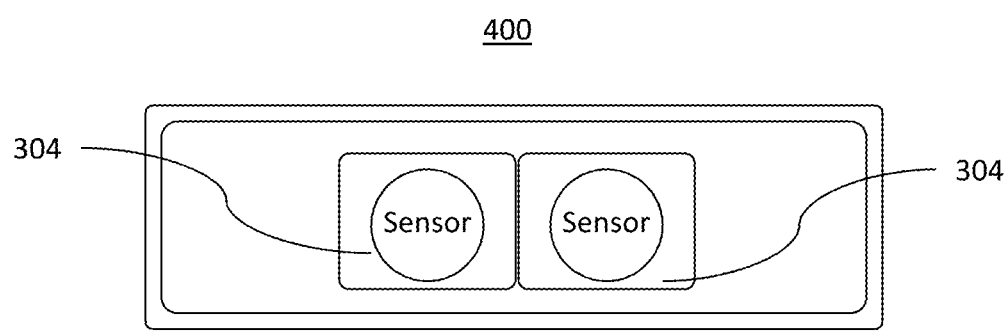

In the examples shown in FIGS. 3A and 3B, the sensing device 300 is formed as a uni-body in the housing 302. The distance between the imaging sensors 304 is fixed. However, such a distance may be adjustable. FIGS. 4A-4C show an exemplary sensing device 400 which has a uni-body design but has movable imaging sensors 304. The distance between the imaging sensors 304 may be adjusted via a certain mechanism. For example, in the sensing device 400, the imaging sensors 304 are formed on a guide 404, which is configured to allow the imaging sensors 304 to move thereon, so that the distance between the imaging sensors 304 may be adjusted. Such a design is also referred to as adjustable uni-body design.

FIGS. 4A-4C show different states of the imaging sensors 304 in which the distance between the imaging sensors 304 is different. For simplicity, other components, such as the illumination sources, are not shown in FIGS. 4A-4C.

Figure 5:
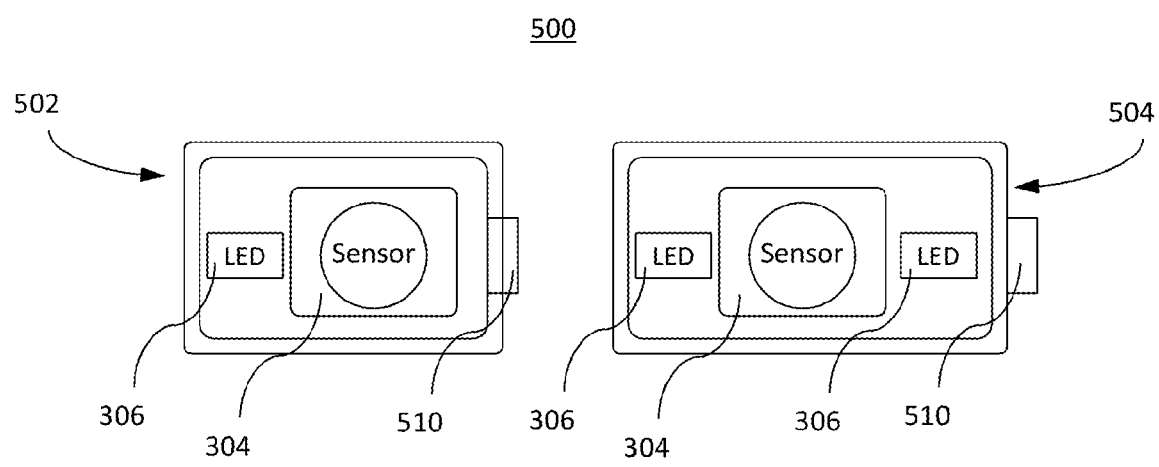
FIG. 5 schematically shows a sensing device according to an exemplary embodiment.

In some embodiments, the sensing device 102 may have multiple separated units each having one imaging sensor. Hereinafter, such a design is also referred to as a separate design. FIG. 5 shows an exemplary sensing device 500 having a separate design, consistent with embodiments of the disclosure. The sensing device 500 includes two sensing units 502 and 504, each having one imaging sensor 304 and one or more illumination sources 306. In the example shown in FIG. 5, the sensing unit 502 has one illumination source 304, while sensing unit 504 has two illumination sources 306. The sensing units 502 and 504 may each have a controlling circuit for controlling the operation of corresponding sensing unit.

Figure 6A:
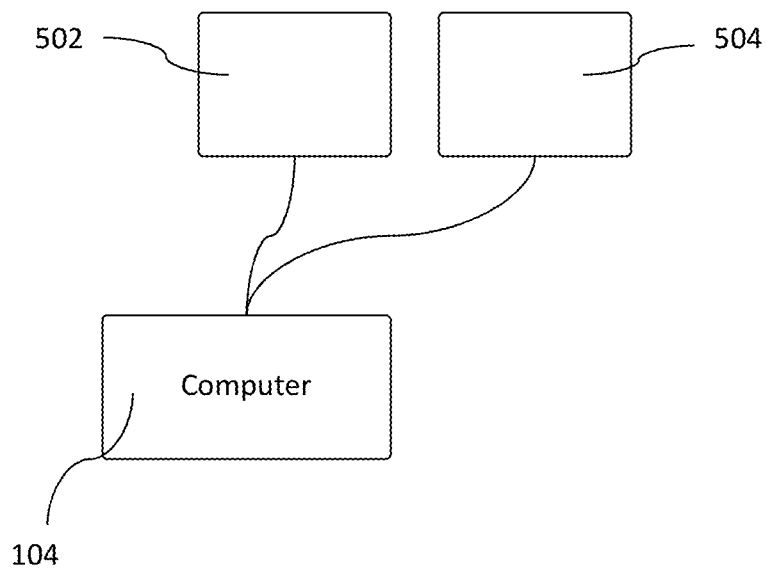
FIGS. 6A and 6B schematically show the connection of sensing units to a computer according to an exemplary embodiment.
Figure 6B:
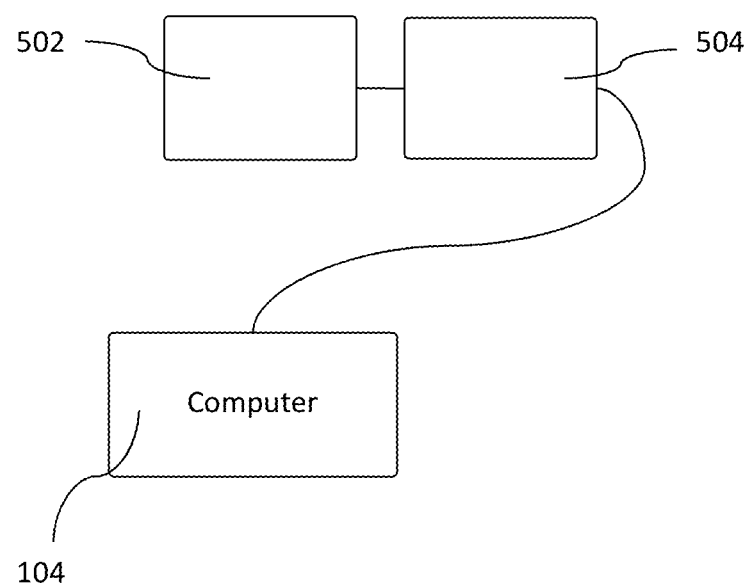

The sensing units 502 and 504 may each include one or more connection ports 510, either wired or wireless, for connecting to other sensing units or directly to the computer 104. FIGS. 6A and 6B schematically show two difference schemes for connecting the sensing units 502 and 504 to the computer 104. FIG. 6A shows a parallel connection where the sensing units 502 and 504 are directly connected to the computer 104. FIG. 6B shows a serial connection where the sensing unit 502 is connected to the sensing unit 504, and the sensing unit 504 is further connected to the computer 104. In the set up shown in FIG. 6A, both sensing units 502 and 504 are controlled by the computer 104 and synchronized. In the set up shown in FIG. 6B, the synchronization may be forwarded from the sensing unit 504 to the sensing unit 502 so that both sensing units 502 and 504 are synchronized.

Figure 7A:
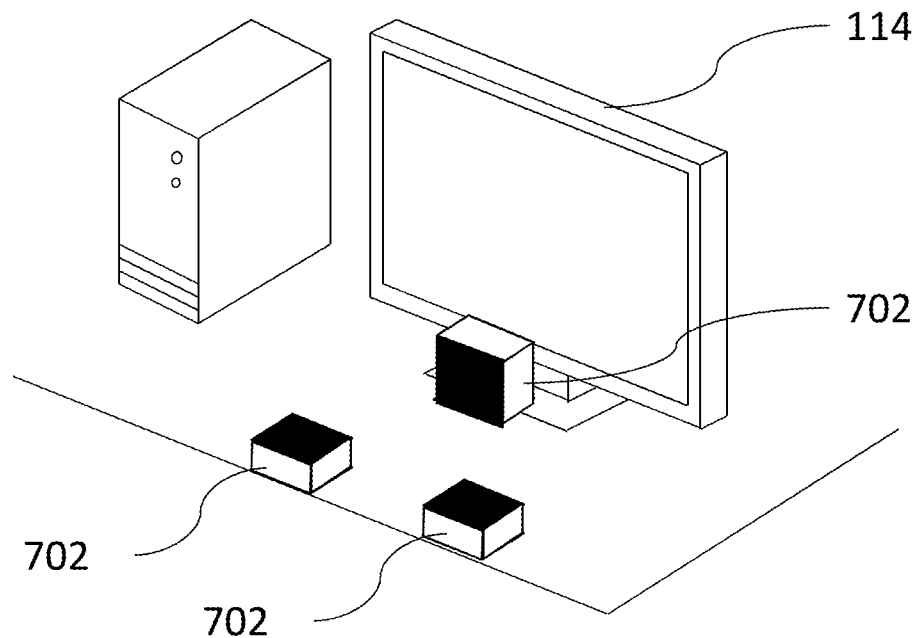
FIGS. 7A and 7B schematically show exemplary arrangements of sensing units relative to a display.
Figure 7B:
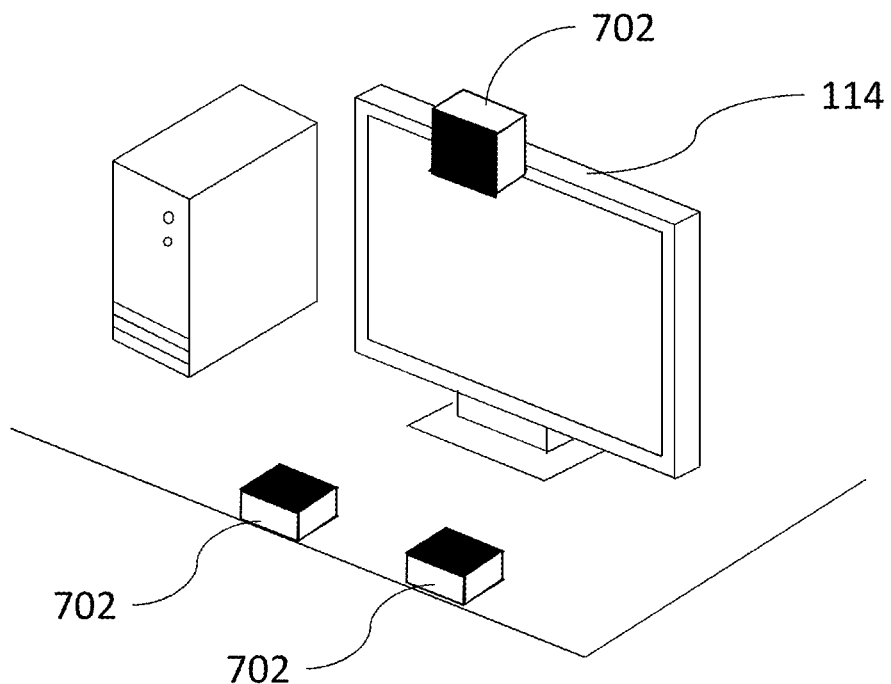

FIGS. 7A and 7B schematically show exemplary arrangements of sensing units relative to a display 114. Three sensing units 702 are shown in each of FIGS. 7A and 7B.

Consistent with embodiments of the present disclosure, to detect, recognize, and track a foreground object, such as a hand or a finger of a user, the brightness of the background may need to be lowered. That is, a dark background may need to be created.

Figures 8A, 8B, 9:
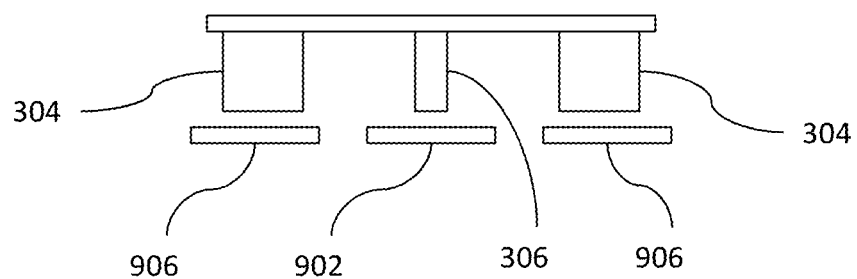
FIGS. 8A and 8B schematically show background surface coating according to exemplary embodiments.
FIG. 9 schematically shows a sensing device according to an exemplary embodiment.

In some embodiments, the dark background may be created using polarized light. According to these embodiments, a background surface may be coated with a reflective material that has a "non-depolarizing" property, such as shown in FIG. 8A. Reflected light from such a material may preserve the circular polarization property of incoming light. Such a material may be, for example, silver colored. In some embodiments, other color dyes or particles may be mixed with the reflective material to create desired color, texture, or patterns, such as shown in FIG. 8B. In some embodiments, as shown in FIGS. 8A and 8B, another coating may be formed between the background surface and the non-depolarizing material coating.

FIG. 9 shows a sensing device 900 consistent with embodiments of the present disclosure, where a first polarizer 902 having a first polarization direction is placed in front of the illumination source 306 and a second polarizer 906 having a second polarization direction is placed in front of each of the imaging sensors 304. The first and second polarization directions may be inconsistent with each other. The first and second polarizers 902 and 906 may be circular polarizers.

The light emitted by the illumination source 306 is polarized by the first polarizer 902 to have the first polarization direction. When this polarized light is reflected by the non-depolarizing material coated over the background surface, the polarization direction is preserved. Since the second polarizers 906 have a polarization direction inconsistent with that of the first circular polarizer 902, the reflected light with unchanged polarization direction, the reflected light, or at least most part of the reflected light, cannot pass through the circular polarizers 906 to reach the imaging sensors 304. In effect, the background surface appears to be dark or black to the imaging sensors 304.

On the other hand, when the polarized light is reflected by the foreground object, e.g., the hand or finger of the user, the polarized light will be de-polarized. Such de-polarized reflected light can pass through the second polarizers 906 and be received by the imaging sensors 304. That is, the foreground objects appears to be bright to the imaging sensors 304, and thus the imaging sensors 304 can "see" the foreground objects.

Figure 10A:
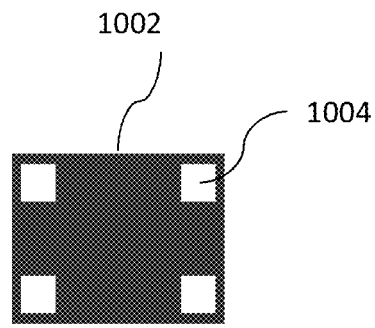
FIGS. 10A and 10B show a background surface with markers viewed by an imaging sensor and by a naked human eye, respectively.
Figure 10B:
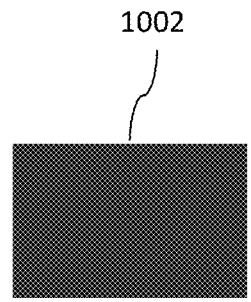

Another method consistent with embodiments of the disclosure for creating a dark background is to use "invisible" markers. Such "invisible" markers may be invisible to naked human eyes but can be detected by the imaging sensors consistent with embodiments of the disclosure. FIGS. 10A and 10B show a background surface 1002 with markers 1004. An image of the background 1002 captured by an imaging sensor will show the markers 1004, as shown in FIG. 10A. On the other hand, a human user will only see a normal, uniform surface without markers, as shown in FIG. 10B.

Figure 11A:
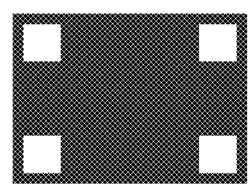
FIGS. 11A and 11B show patterns printed using different types of inks for creating a background surface with markers according to an exemplary embodiment.
Figure 11B:
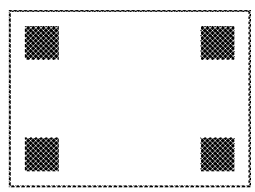

A method consistent with embodiments of the present disclosure for creating a background surface having "invisible" markers will be described in regard to FIGS. 11A and 11B. The method involves the use of two types of inks, i.e., a first ink and a second ink, which both appear to naked human eyes as a certain color, such as, for example, black. However, the first ink absorbs, or at least absorbs most of, IR light, while the second ink does not absorb but may reflect IR light. Therefore, the first ink appears to an IR imaging sensor as, for example, black, while the second ink appears to the IR imaging sensor as, for example, white.

Consistent with embodiments of the disclosure, a first pattern is printed on the background surface, e.g., a fabric, using the first ink. The first pattern may, for example, be a pattern shown in FIG. 11A, where the dark portion represents the part covered by the first ink. In some embodiments, the first pattern may be printed using a laser printer, since the toner of a laser printer is based on carbon particles, which absorbs IR light. Then a second pattern is printed on the same background surface using the second ink. The second pattern may, for example, be a pattern shown in FIG. 11B, where the dark portion represents the part covered by the second ink. In some embodiments, the second pattern may be printed using an ink-jet printer, since the black ink used in an ink-jet printer is based on non-IR-absorbing black dyes. In some embodiments, both the first and second patterns may be printed using copperplate printing.

In some embodiments, the first pattern and the second pattern are essentially reversed to each other. That is, where a point in the first pattern is dark, the corresponding point in the second pattern is bright. As a result, the background surface exhibits a uniform color without patterns to naked human eyes, such as the background surface 1002 shown in FIG. 10B. On the other hand, the imaging sensors can detect the pattern on the background surface, such as that shown in FIG. 10A.

In some embodiments, the printing described above may also be a single phase printing process using one inkjet printer which contains two types of inks, i.e., a carbon based ink and a non-carbon based ink.

The methods for using the interactive system 100 and related algorithms consistent with embodiments of the disclosure will be described below. In some embodiments, the imaging sensors 304 may be calibrated before use. If the sensing device 102 employs a uni-body design, such as that shown in FIG. 3A or 3B, the calibration of the imaging sensors 304 may be performed during the manufacturing process of the sensing device 102. On the other hand, if the sensing device 102 employs an adjustable uni-body design, such as that shown in FIG. 4A, 4B, or 4C, or a separate design, such as that shown in FIG. 5, the user may customize the position of each imaging sensor 304. In such situation, the calibration of the imaging sensors 304 may be performed each time the placement of the sensing device 102 is changed.

Figure 12:
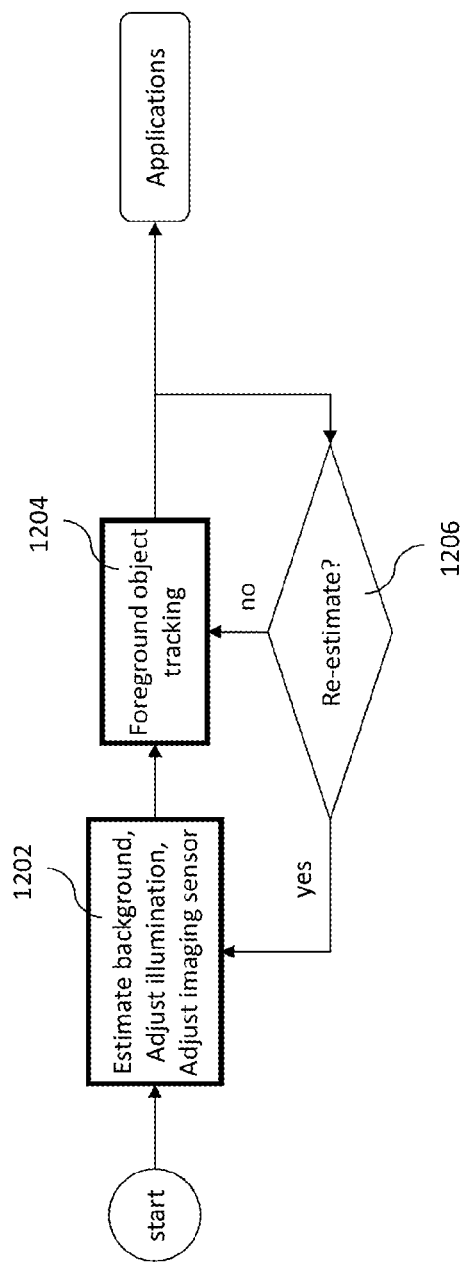
FIG. 12 is a high level process flow schematically showing a sensing process according to an exemplary embodiment.

FIG. 12 is a high level process flow schematically showing a sensing process consistent with embodiments of the disclosure. At 1202, the environment is calibrated, sensor parameters are adjusted, and background is analyzed and recorded. At 1204, foreground object tracking is performed. Foreground objects, e.g., hands or fingers of the user, are continuously detected, and the detected information is output to the computer 104, for example, output to applications installed on the computer 104. At 1206, the interactive system 100 continuously monitors whether there is a need to re-calibrate the environment during the foreground object tracking. Alternatively, the user may manually force to re-start the calibration process.

Consistent with embodiments of the disclosure, the calibration process may generate multi-sensor calibration data that may be used for, e.g., removing distortion in an image output from an imaging sensor due to, e.g., imperfect lens. This may make the computer vision calculation and image processing easier and more accurate. The multi-sensor calibration data may also be used for calculating the 3D position of an object or a point using the pixel position of the object or the point in the image output from the imaging sensor.

In some embodiments, a static calibration may be performed before the interactive system 100 is used. The static calibration uses a checker-board and allows the imaging sensors 304 to take synchronized images when the user moves the checker-board to different locations/orientations. The interactive system 100 analyzes the captured images and generates camera calibration data including, for example intrinsic information of the imaging sensors 304, distortion of the imaging sensors 304, and rectification of multiple imaging sensors 304.

In some embodiments, an automatic calibration may be used during the use of the interactive system 100. The automatic calibration does not need a checker-board and does not need a dedicated calibration session before using the interactive system 100. The automatic calibration is suitable when the user frequently changes relative positions of the imaging sensors 304 in, e.g., a separate design or an adjustable uni-body design, or when the user adds customized lenses or customized imaging sensors 304 into the interactive system 100. According to the automatic calibration, when the user starts to use the interactive system 100, the imaging sensors 304 each take a synchronized snap shot. The interactive system 100 finds matching features, e.g., a finger tip, between snap shots taken by different imaging sensors, and records paired pixel coordinates of the same feature, e.g., the same finger tip, that appears in different snap shots. This process is repeated to collect a set of paired pixel coordinates, and the set of paired pixel coordinates are used by an imaging sensor calibration algorithm consistent with embodiments of the disclosure.

Figure 13:
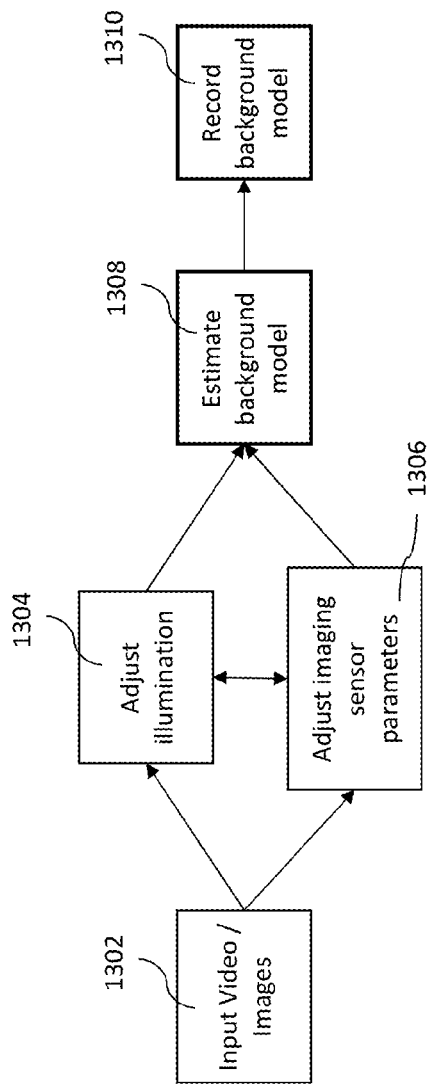
FIG. 13 shows an process for adjusting illumination sources and imaging sensors, and estimating a background according to an exemplary embodiment.

FIG. 13 shows a process consistent with embodiments of the disclosure for adjusting the illumination sources 306 and the imaging sensors 304, and estimating the background.

At 1302, the imaging sensors 304 capture videos or images of a background.

At 1304, the brightness of environment light is observed. The illumination intensity of the illumination sources 306 is adjusted according to the observed environmental brightness. In some embodiments, the illumination intensity is adjusted to be low enough to save energy but high enough to distinguish the foreground objects, e.g., hands or fingers, from the background.

At 1306, the gain level and the shutter duration of the imaging sensors are adjusted so that the final image is bright enough. Higher gain level results in brighter but nosier images. Longer shutter duration results in brighter images, but the images may be blurry when the foreground object is moving. In some embodiments, 1302 and 1304 are performed in a loop to find optimal illumination intensity of the illumination sources 306 and parameters of the imaging sensors 304.

At 1308, a background model is analyzed and estimated. At 1310, the background model is recorded. When tracking a foreground object, new images will be compared to this background model to distinguish the foreground object from the background.

Figure 14:
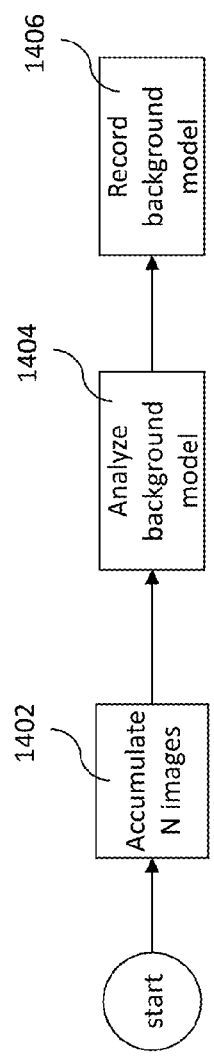
FIG. 14 schematically shows a process for analyzing and recording a background model according to an exemplary embodiment.

FIG. 14 schematically shows a process consistent with embodiments of the disclosure for analyzing and recording the background model. This process may be performed for each of the imaging sensors 304. As shown in FIG. 14, at 1402, a number of images are captured and accumulated. The number of accumulated images may be a pre-set fixed number, such as, for example, 100. Alternatively, the number of accumulated images may be variable, depending on when the background model analysis converges.

At 1404, the background model is analyzed based on the accumulated images. In some embodiments, the background model may include, for example, an average brightness and a maximum brightness of each pixel, a brightness variance, i.e., noisiness, of each pixel, or a local texture property and local color property of each pixel.

At 1406, the background model is stored, and the process ends.

Figure 15:
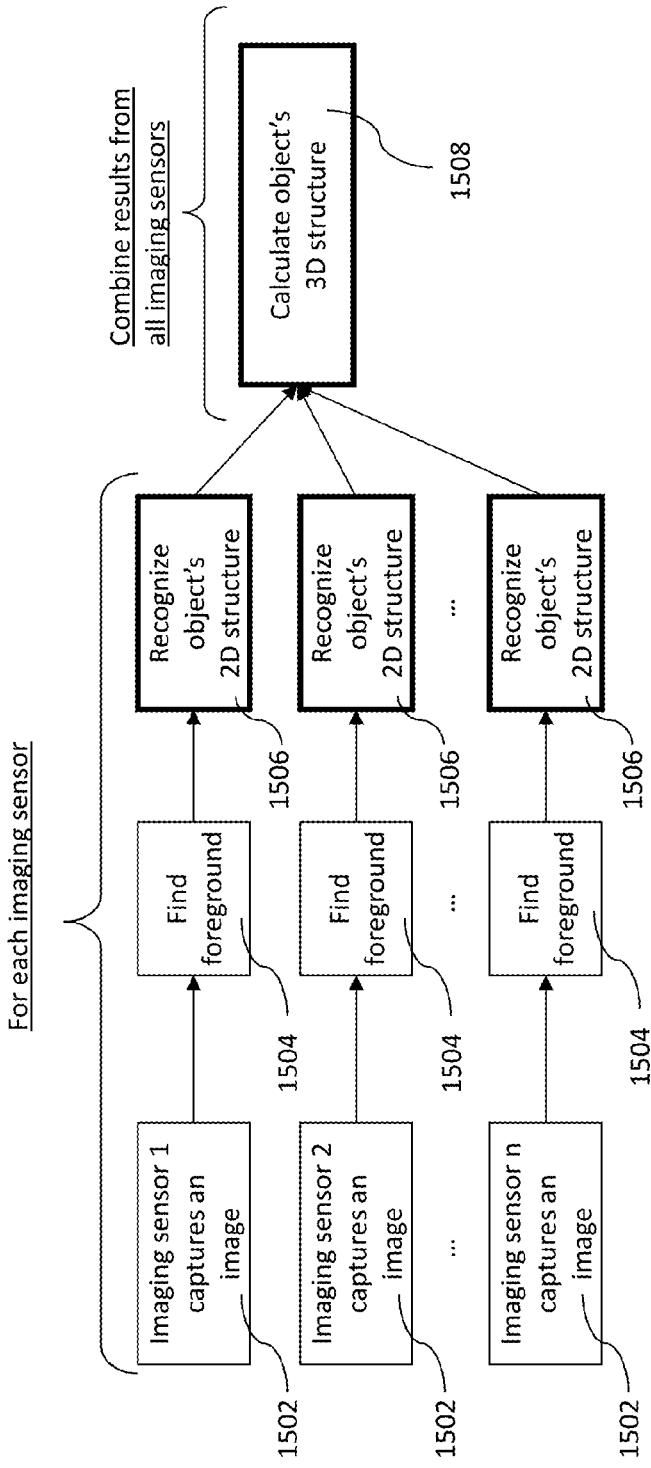
FIG. 15 schematically shows a process for recognizing and tracking a foreground object based on multiple imaging sensors according to an exemplary embodiment.

FIG. 15 schematically shows a process for recognizing and tracking a foreground object, e.g., a hand or a finger, based on multiple (2 or more) imaging sensors 304. For each imaging sensor 304, an image is captured (1502). The captured image is compared to the stored background model to obtain a foreground image (1504). At 1506, the foreground image is analyzed and the object's 2D structure is obtained.

Then, at 1508, the analyzing results from each imaging sensor 304 are combined and processed to obtain the foreground object's 3D structure.

Figure 16:
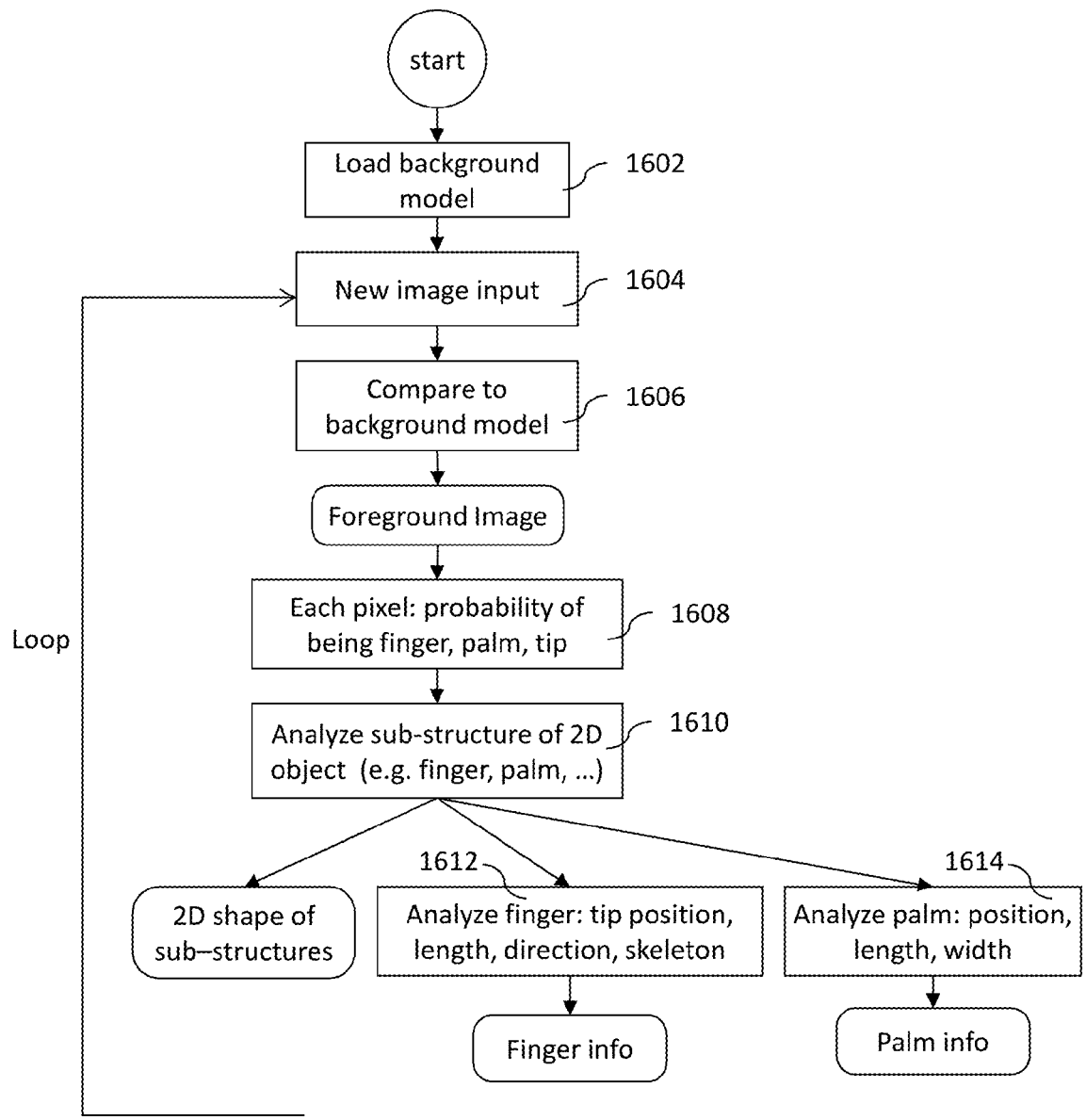
FIG. 16 schematically shows a process for finding a foreground object and recognizing the foreground object's 2D structure for each imaging sensor according to an exemplary embodiment.

FIG. 16 schematically shows a process consistent with embodiments of the disclosure for finding the foreground object and recognizing the foreground object's 2D structure for each imaging sensor 304. In the example shown in FIG. 16 and related figures, the scenario that the foreground object is the user's hand is discussed.

Figure 17:
FIG. 17 shows an exemplary background model image.

At 1602, the background model previously obtained is loaded. The background model may be, for example, a brightness-based background model, where the maximum brightness of each pixel for, e.g., 100 initial frames is stored. FIG. 17 shows an exemplary background model image.

Figure 18:
FIG. 18 shows an exemplary input image captured during a hand tracking process.

Referring again to FIG. 16, a loop is performed to capture new images and analyze the 2D structure of the foreground object. In some embodiments, at 1604, a new 2D input image is captured by an imaging sensor 304. FIG. 18 shows an exemplary input image captured during a hand tracking process.

Referring again to FIG. 16, after the input image is obtained, the following is performed: 1) find the foreground object (1606), 2) analyze sub-structures of the foreground object (1608 and 1610), and 3) analyze detailed properties of the foreground object (1612 and 1614). Details of such a process is described below.

At 1606, the new input image from the imaging sensor 304 is compared with the background model to extract a foreground region. In the background model, each pixel at position (x,y) may have a feature vector B(x,y). For example, if the background model is based on intensity/brightness, then B is a scalar, and the value of B(x,y) is the brightness of the pixel at position (x,y). If the background model is based on noisiness, then B is a scalar, and the value of B(x,y) is the variance at position (x,y). In some embodiments, for the new input image, the feature vector for every pixel, In(x,y), is calculated. Similar to B(x,y), the value of In(x,y) may be brightness or variance depending on what background model is used. A difference between In(x,y) and B(x,y) is calculated for each pixel position. If the difference at a pixel position is greater than a certain threshold, that pixel is determined to belong to the foreground region. Otherwise, that pixel is determined to belong to the background.

Figure 19:
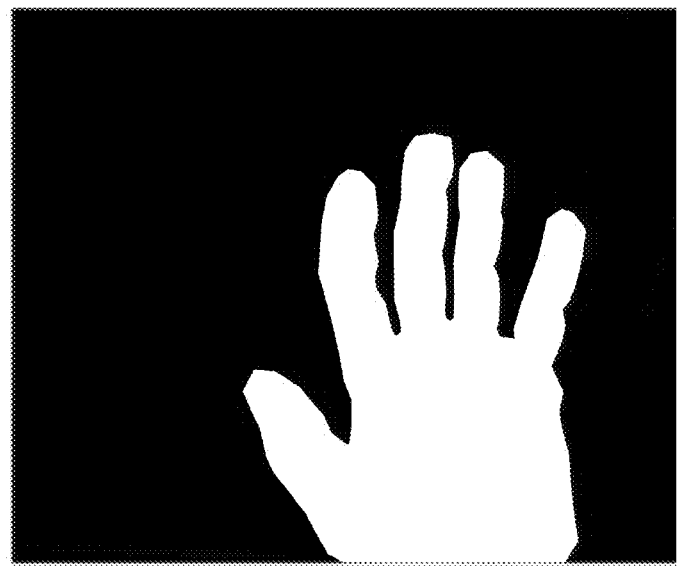
FIG. 19 shows an exemplary foreground region.

FIG. 19 shows an exemplary foreground region, in which white pixels represent the foreground object.

Referring again to FIG. 16, at 1608, within the foreground region, at each pixel position (x,y), the pixel's probability of being part of a finger tip, P_tip(x,y), the pixel's probability of being part of a finger trunk, P_finger(x,y), and the pixel's probability of being part of a palm P_palm(x,y) are calculated.

In some embodiments, the probabilities P_tip(x,y), P_finger(x,y), and P_palm(x,y) may be calculated by comparing a brightness distribution in a neighbor region around the pixel position (x,y) with a set of pre-defined templates, such as a finger tip template, a finger trunk template, and a palm template. The probability of a pixel being part of a finger tip, a finger trunk, or a palm, i.e., P_tip(x,y), P_finger(x,y), or P_palm(x,y) may be defined by how well the neighbor region fits the respective template, i.e., the finger tip template, the finger trunk template, or the palm template.

In some embodiments, the probabilities P_tip(x,y), P_finger(x,y), and P_palm(x,y) may be calculated by performing a function/operator F on the neighbor region of a pixel position (x,y). The function/operator fits the brightness of the neighbor region with light reflection model of a finger or a finger tip, and return a high value if the distribution is close to the reflection of a finger trunk (reflection from a cylinder shape), or a finger tip (reflection from a half dome shape).

Figure 20:
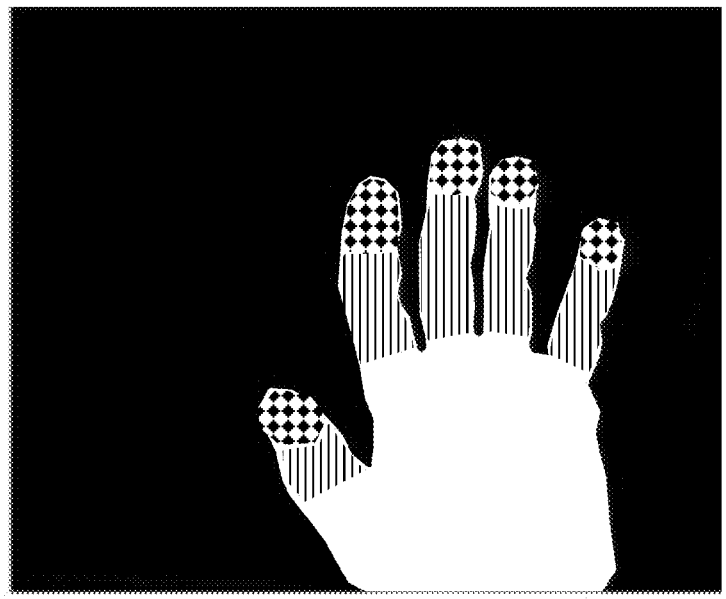
FIG. 20 shows an exemplary result of probability calculation according to an exemplary embodiment.

FIG. 20 shows an exemplary result of the above-discussed probabilities calculation. In FIG. 20, a region having black and white mosaic has a high probability of being a finger tip, a region having vertical hatch lines has a high probability of being a finger trunk, and the white region is a region likely to be a palm, for example.

Figure 21:
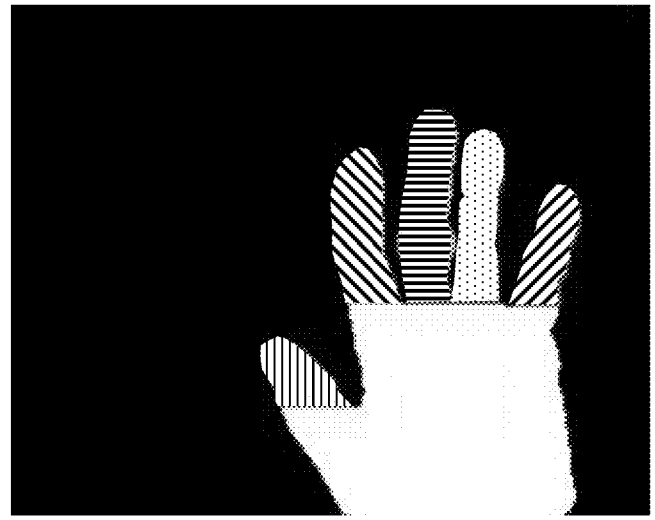
FIG. 21 shows a result of the segmentation according to an exemplary embodiment.

Referring again to FIG. 16, at 1610, the calculated probabilities P_tip(x,y), P_finger(x,y), and P_palm(x,y) are used to segment the foreground object, e.g., the user's hand, into fingers and palm. FIG. 21 shows a result of the segmentation. In FIG. 21, the regions with shadows are the fingers and the white region is the palm.

The probabilities P_tip(x,y), P_finger(x,y), and P_palm(x,y), and the segmentation results may be used to calculate a hand structure, including finger skeleton information. As used in this disclosure, a finger skeleton refers to an abstraction of the structure of a finger. In some embodiments, the finger skeleton information may include, for example, a center line (also referred to as a skeleton line) of the finger, a position of the finger tip, and a boundary of the finger.

Figure 22:
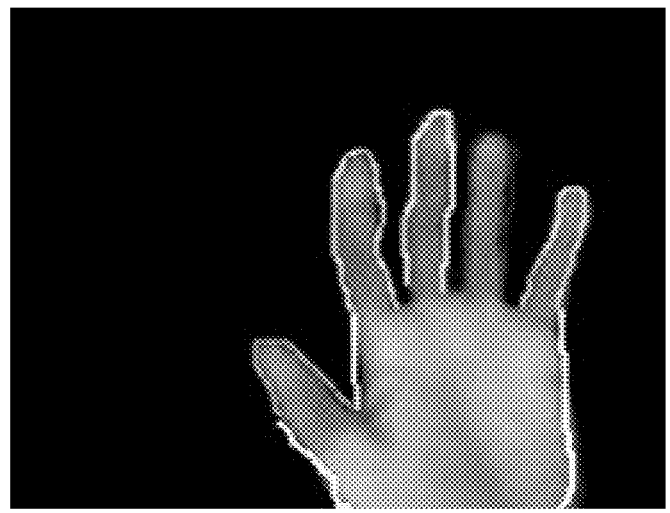
FIG. 22 schematically shows 2D boundaries of sub-parts of a hand.

In some embodiments, after the user's hand is segmented to the fingers and the palm, the 2D boundary of a sub-part of the hand, e.g., a finger or a palm, may be obtained. FIG. 22 schematically shows the 2D boundaries of the sub-parts of the hand. As discussed above, the boundary of a finger may be part of the finger skeleton information.

Referring again to FIG. 16, at 1612, a finger's center line is calculated by finding and connecting center positions on scanning lines across the finger. As used herein, a scanning line refers to a line along which the process for finding the center position is performed. The scanning line may be, for example, a horizontal line. In some embodiments, for a scanning line L(y) in a finger, a weighted average of the position x of every pixel (x,y) on the horizontal line L(y) is calculated using the probability P_finger(x,y) as a weighting factor. This weighted average of the position x is the center position, x_center=C(y), on the scanning line L(y).

Figure 23:
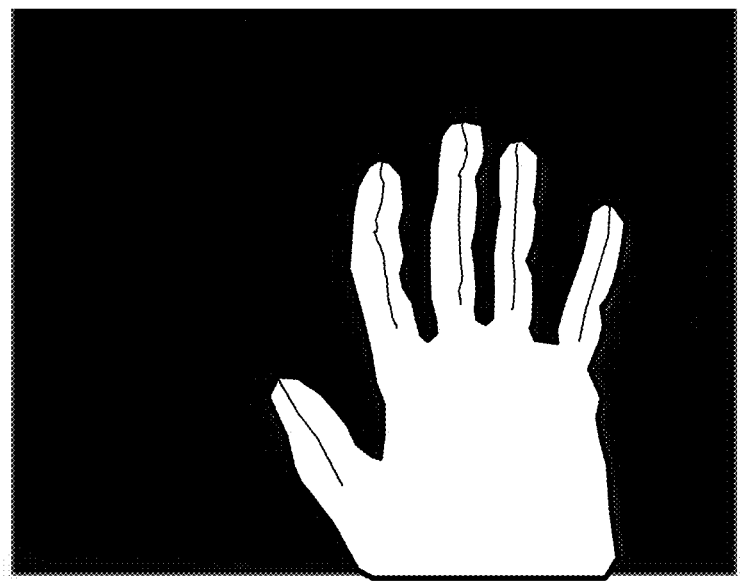
FIG. 23 schematically shows center lines for fingers.

After all the scanning lines in the finger are processed, a series of center positions C(y) on the scanning lines L(y) is obtained. Connecting these center positions provides the center line of the finger, i.e., the finger skeleton's center line. FIG. 23 schematically shows the center lines for the fingers.

Referring again to FIG. 16, also at 1612, a finger tip's position, (Tx,Ty) is calculated. The finger tip's position may be defined as the position of a top region of the finger that matches the shape and shade of a finger tip. In some embodiments, the finger tip's position may be calculated by averaging the positions of all pixels in the finger tip using the probability P_tip(x,y) as a weighting factor. For example, $$Ty = \frac{\sum_y \sum_x P\_tip(x, y) * y}{\sum_y \sum_x P\_tip(x, y)} \quad (1)$$

Figure 24:
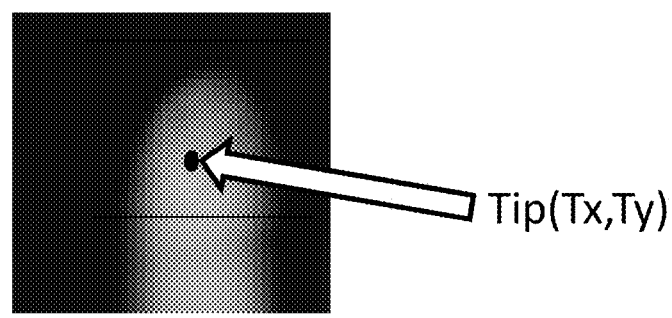
FIG. 24 schematically shows a finger tip.

In other embodiments, the finger tip's position may be calculated by using the probability P_finger(x,y) as a weighting factor to average the positions of the pixels in the top region of the finger. In the resulting finger tip position (Tx, Ty), such as, for example, the result shown in FIG. 24, both Tx and Ty are float point numbers, having a sub-pixel resolution.

Figure 25:
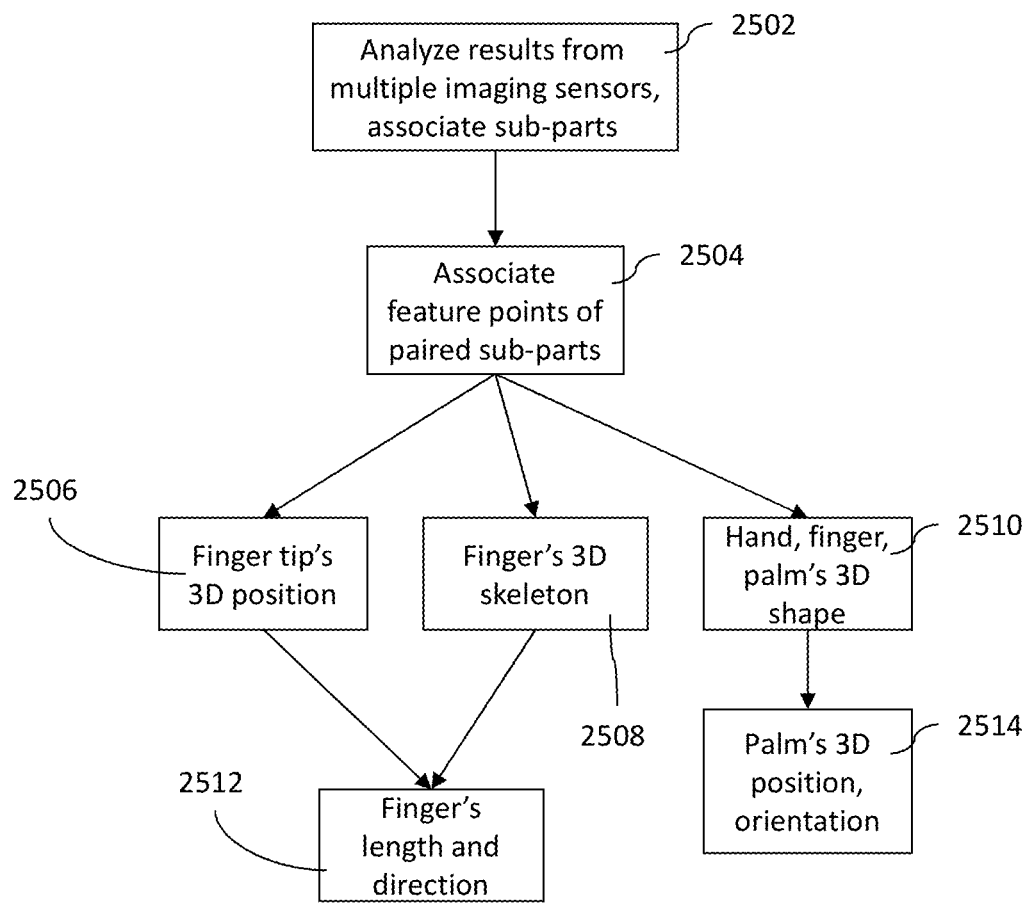
FIG. 25 is a high-level flow chart showing a process for calculating 3D information of a foreground object and subparts of the foreground object according to an exemplary embodiment.

FIG. 25 is a high-level flow chart showing a process for calculating 3D information of the foreground object and subparts of the foreground object consistent with embodiments of the disclosure. Similar to the process shown in FIG. 16, in FIG. 25, the user's hand is used as an example of the foreground object.

Figure 26:
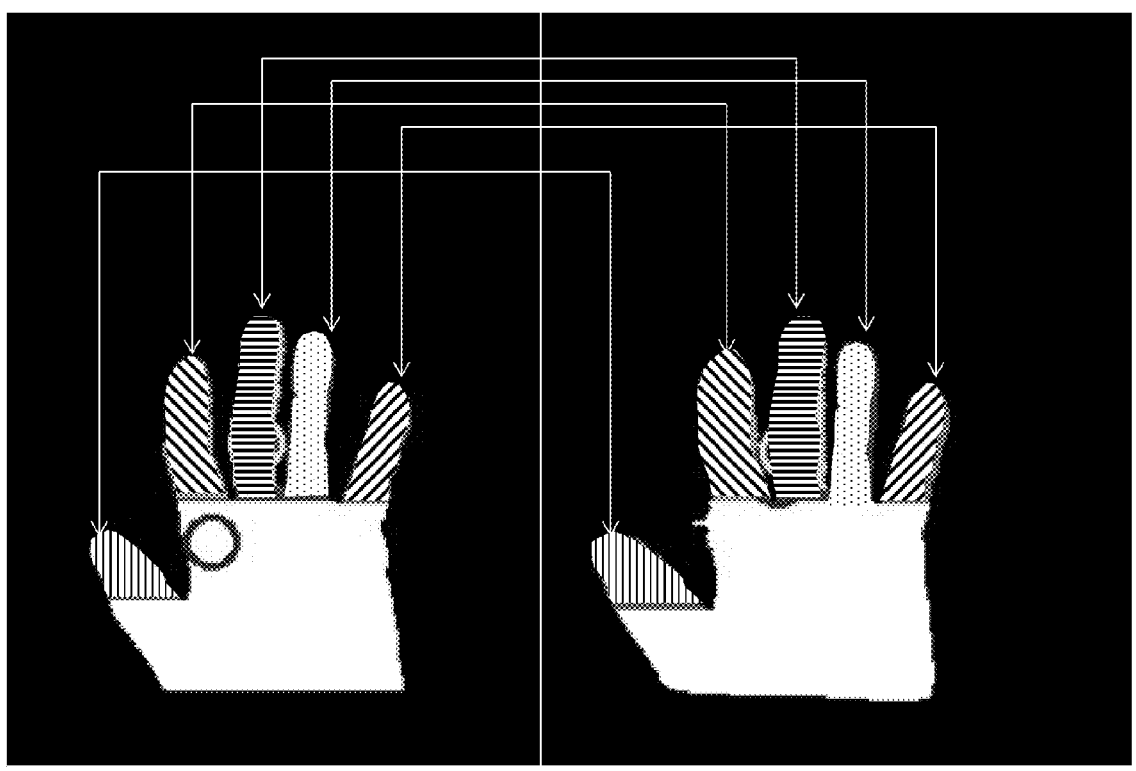
FIG. 26 shows an association between fingers according to an exemplary embodiment.

At 2502, the 2D sub-structure results, e.g., fingers or palm, from different imaging sensors 304 are compared and an association between sub-parts of the foreground object observed by different imaging sensors 304 is created. For example, finger A observed by imaging sensor A may be associated with finger C observed by imaging sensor B. In some embodiments, the association may be based on minimizing the total finger tip distance between all finger pairs, such as shown in FIG. 26. In the example shown in FIG. 26, the left half and the right half respectively show a 2D image of a hand, i.e., the foreground object, captured by two different imaging sensors 304.

Figure 27:
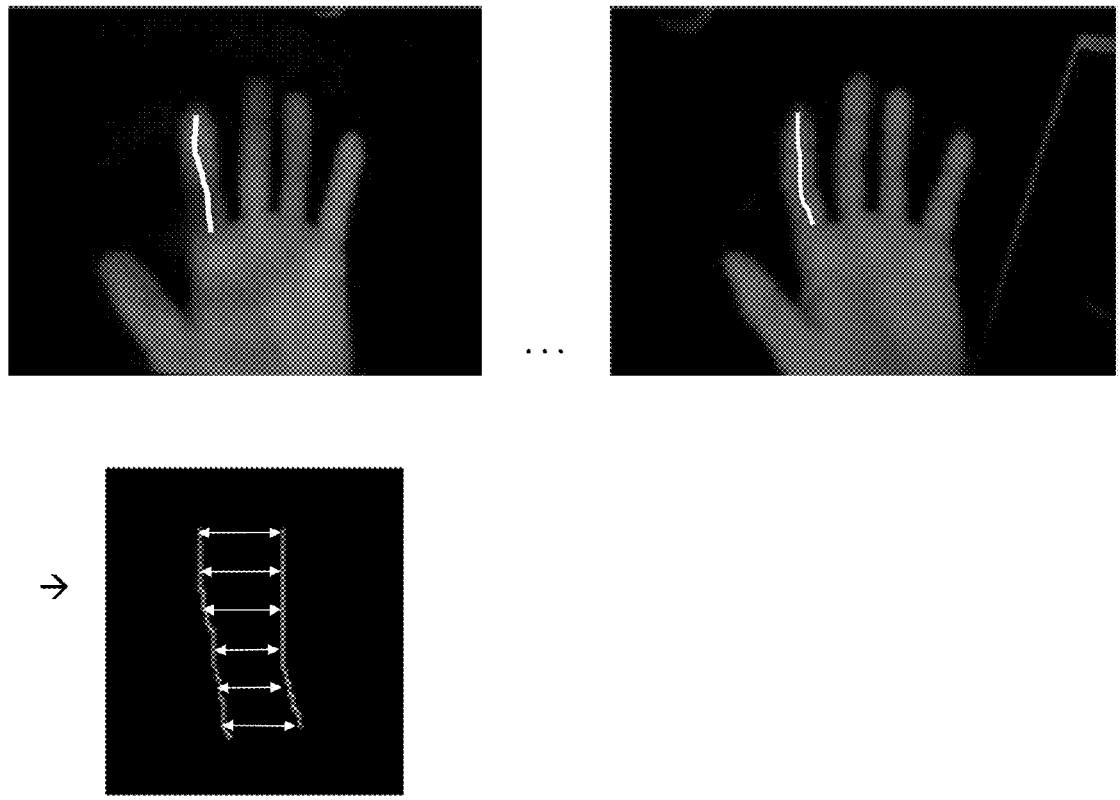
FIG. 27 shows an example of associating two skeleton lines.

Referring again to FIG. 25, at 2504, features, such as 2D finger tip, 2D skeleton line, and 2D boundary points, of associated sub-parts are further associated, to obtain finger tip pairs, skeleton line pairs, and boundary point pairs, respectively. FIG. 27 schematically shows an example of associating a first 2D skeleton line of a finger in a first 2D image (upper left image) taken by a first imaging sensor 304 and a second 2D skeleton line of the finger in a second 2D image (upper right image) taken by a second imaging sensor 304. As a result of the association, a skeleton line pair image (bottom image) is obtained.

Referring again to FIG. 25, at 2506, 2508, and 2510, 3D skeleton line, 3D finger tip, and 3D boundary points (e.g., 3D shape of the hand, finger, or palm) are calculated, respectively, as described in more details below.

At 2506, a finger tip pair, T1(Tx1,Ty1) and T2(Tx2,Ty1), is processed to obtain 3D information, such as 3D position T(Tx,Ty,Tz), of the corresponding finger tip. In some embodiments, a 3D reprojection function may be used to calculate the 3D tip position T(Tx,Ty,Tz). The 3D reprojection function may use the 2D positions (Tx1,Ty1) and (Tx2, Ty1) of the finger tip, and information of the imaging sensors 304 and the lenses, such as, for example, focal length, sensor's pitch (e.g., pixels per millimeter), separation between the two imaging sensors 304 (baseline). In some embodiments, a disparity, d=Tx1−Tx2, is calculated and used as an input for the 3D reprojection function. The output of the 3D reprojection function is the 3D position (Tx,Ty,Tz) of the finger tip. The 3D position (Tx,Ty,Tz) may have a physical unit, and thus may also be expressed as (fx,fy,fz).

In some embodiments, the 3D reprojection function may be expressed using a 4×4 perspective transformation matrix obtained during the imaging sensor calibration process. This matrix may be a disparity-to-depth mapping matrix.

Figure 28:
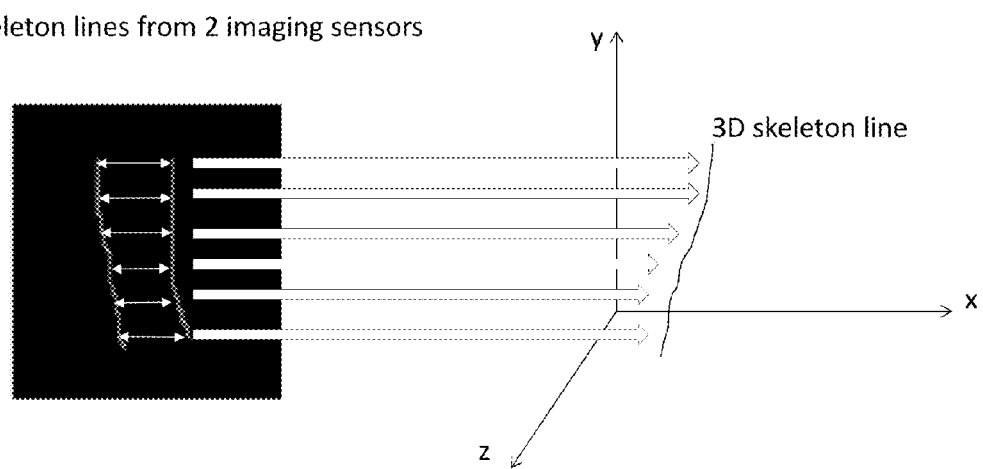
FIG. 28 shows a 3D skeleton obtained according to an exemplary embodiment.

At 2508, using the skeleton line pair obtained as described above, a 3D skeleton line for the corresponding finger is calculated. In some embodiments, for the skeleton line pair, pixels on the two 2D skeleton lines are paired based on their y direction to obtain pairs of pixels. A pair of pixels may be processed in a manner similar to that described above for the processing of finger tip pairs, to obtain a 3D position of a point corresponding to the pair of pixels, as shown in FIG. 28. After all pairs of pixels are processed, the resulting points are connected to obtain the 3D skeleton line, as shown in FIG. 28.

Referring back to FIG. 25, at 2510, 3D positions of boundary points for, e.g., fingers or palms, are calculated based on 2D positions of the boundary points on the images taken by two different imaging sensors 304. In some embodiments, the 3D position of a boundary point may be calculated in a manner similar to that for calculating the 3D position of the finger tip. After the 3D positions of the boundary points are calculated, the corresponding points in the 3D space may be connected to obtain the 3D boundary.

Figure 29:
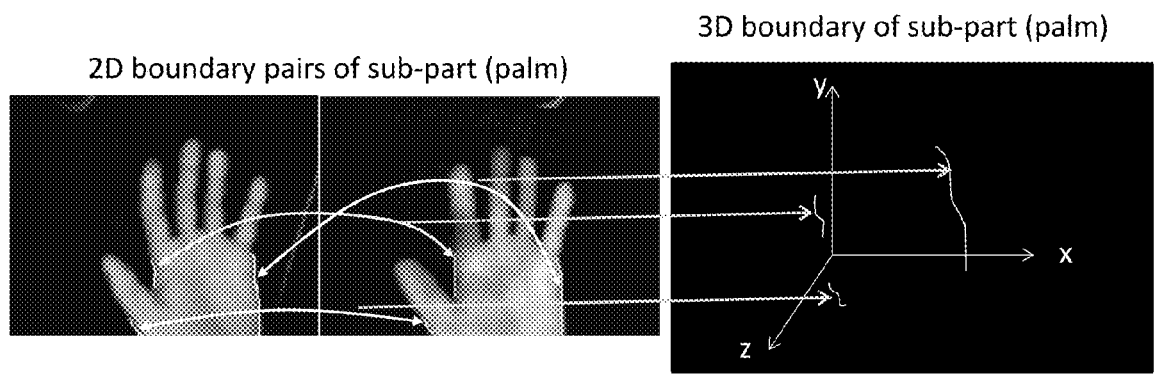
FIG. 29 shows a calculation of a 3D boundary of a palm based on 2D boundaries of the palm in two 2D images taken by two different imaging sensors.

FIG. 29 shows the calculation of a 3D boundary of a palm based on 2D boundaries of the palm in two 2D images taken by two different imaging sensors 304.

Figure 30:
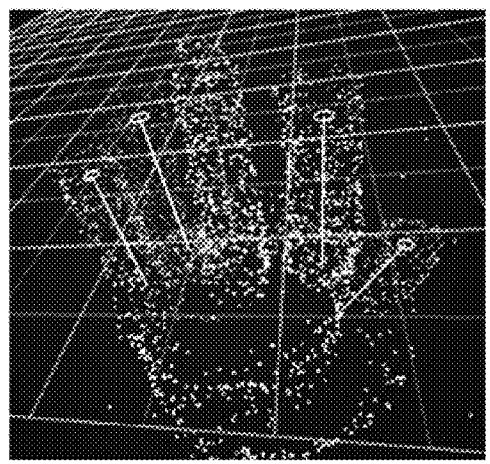
FIG. 30 shows an exemplary output of hand skeleton calculation.

The above-obtained information may be combined to generate an output, such as the exemplary output shown in FIG. 30, which shows the 3D tips (the circles in FIG. 30) of the fingers, the 3D skeleton lines (the lines in FIG. 30) of the fingers, and the 3D shape of the hand.

For some applications such as painting and sculpturing, the user may need to use a finger or a pen as a tool. In such situation, the finger or the pen may need to be abstracted as a cylinder shape, and its direction and length may need to be calculated. Referring again to FIG. 25, at 2512, the direction and length of a finger is calculated.

In some embodiments, the finger is abstracted as a cylinder shape and its length is defined as the length of the cylinder shape, which may also be referred to as a finger cylinder length. The finger cylinder length may be defined as a distance between a very top point of the skeleton line of the finger or the position of the finger tip, P0(x,y,z), and a stop point P1(x,y,z). In some embodiments, the stop point P1 is the end of the skeleton line or the point where the skeleton line deviates from a straight line, e.g., where a difference from the skeleton line and a straight line is greater than a threshold. Similarly, the direction of the finger may be defined as the direction of a line connecting points P1 and P0.

Figure 31:
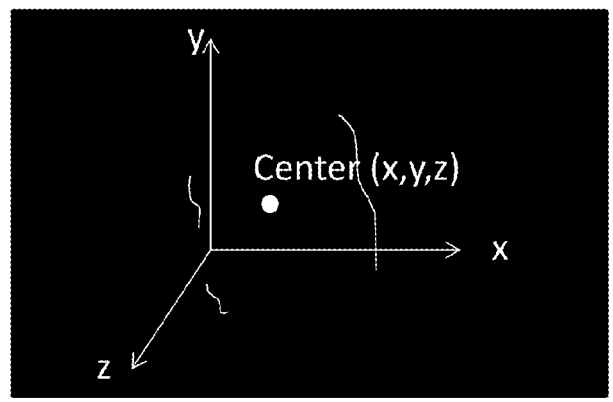
FIG. 31 schematically shows a 3D center of a palm calculated according to an exemplary embodiment.

At 2514, the 3D position and the orientation of the palm are calculated. The 3D position of the palm may also be referred to as a 3D center of the palm, which may be obtained by, for example, averaging the 3D positions of the boundary points shown in FIG. 29. FIG. 31 schematically shows the calculated 3D center of the palm.

The size and the orientation of the palm may be obtained by comparing the 3D center of the palm, 3D positions of the boundary points of the palm, 3D positions of the finger tips, and the directions of the fingers.

The embodiments discussed above are based on direct matching of multiple views (images) taken by different imaging sensors 304. Embodiments discussed below are related to a model based framework. The model based framework may improve the hand recognition reliability. For example, the model based framework may work for a single imaging sensor 304. That is, the 3D recognition of a hand may still be realized even if only a single imaging sensor 304 is used, because the brightness and the width of a finger from a single image may be used to derive a 3D finger position estimation. Moreover, with the model based framework, when a hand or a finger is partially visible in one view, but fully visible in another view, the interactive system 100 may reliably produce 3D hand tracking results. Even when a finger is obstructed, e.g., the finger merging together with another finger or bending into the palm region, and thus becoming invisible in all views, the position of that finger may still be continuously predicted.

Consistent with embodiments of the disclosure, when the foreground object can only be viewed by a single imaging sensor 304, the distance from the foreground object to the imaging sensor 304 may be estimated based on the brightness of the foreground object or the size of the foreground object. Then, such a distance may be combined with the position, i.e., 2D coordinates, of the foreground object in the view of the imaging sensor 304 to calculate a 3D position (x,y,z) of the foreground object.

Assuming other parameters, e.g., intensity of the illumination light and reflectance of the foreground object, are the same, the brightness of the foreground object, B, is inversely proportional to the square of the distance from the object to the illumination light. In some embodiments, since the illumination light is close to the imaging sensor 304, the distance from the object to the illumination light is approximately equal to the distance from the object to the imaging sensor 304, i.e., $D_{obj\text{-}sensor}$. This relationship can be expressed using the following equation:

$$B = \frac{1}{D_{obj\text{-}sensor}^2} \quad (2)$$

In the above equation, coefficient K incorporates the effect of other parameters such as the intensity of the illumination light and the reflectance of the foreground object, and may be a constant. The above equation can be rewritten as:

$$D_{obj\text{-}sensor} = \sqrt{\frac{K}{B}} \quad (3)$$

Coefficient K can be calculated while the foreground object is able to be viewed by two or more imaging sensors 304. In such a situation, as discussed above, the 3D position of the foreground object can be calculated and thus the distance $D_{obj\text{-}sensor}$ can be obtained. The distance $D_{obj\text{-}sensor}$ may be continuously monitored to record $D_{obj\text{-}sensor}$ at time t: $D_{obj\text{-}sensor}(t)$. Meanwhile, the brightness of the foreground object at time t, B(t), can be obtained from images captured by the two or more imaging sensors 304. Plugging $D_{obj\text{-}sensor}(t)$ and B(t) into Eq. (2) or Eq. (3) above, coefficient K can be calculated.

Then, if at time t', only one single imaging sensor 304 can detect the foreground object, the brightness of the foreground object at t', i.e., B(t'), and the coefficient K can be plugged into Eq. (3) to calculate $D_{obj\text{-}sensor}(t')$.

Similarly, the size of the foreground object in an image captured by an imaging sensor 304 may also be used to estimate $D_{obj\text{-}sensor}$. The size of the foreground object in an image captured by an imaging sensor 304 can be expressed as follows:

$$L = \frac{1}{D_{obj\text{-}sensor}} \times K' \quad (4)$$

where coefficient K' incorporates the effect of other parameters, such as the actual size of the foreground object. Eq. (4) can be rewritten as:

$$D_{obj\text{-}sensor} = \frac{1}{L} \times K' \quad (5)$$

Similar to the embodiments where the brightness of the foreground object is used to estimate $D_{obj\text{-}sensor}$, in the embodiments of using the size of the foreground object in the image captured by the imaging sensor 304 to estimate $D_{obj\text{-}sensor}$, coefficient K' can be calculated while the foreground object is able to be viewed by two or more imaging sensors 304, when the distance $D_{obj\text{-}sensor}$ may be continuously calculated and monitored to record $D_{obj\text{-}sensor}$ at time t: $D_{obj\text{-}sensor}(t)$. Meanwhile, the size of the foreground object in the image captured by the imaging sensors 304 at time t, L(t), can be obtained from the captured images. Plugging $D_{obj\text{-}sensor}(t)$ and L(t) into Eq. (5) or Eq. (6) above, coefficient K' can be calculated.

Then, if at time t', only one single imaging sensor 304 can detect the foreground object, the size of the foreground object in the captured image at t', i.e., L(t'), and the coefficient K' can be plugged into Eq. (5) to calculate $D_{obj\text{-}sensor}(t')$.

In some embodiments, the above-described methods for estimating $D_{obj\text{-}sensor}$ may be combined to provide a more accurate result. That is, an estimate $D_{obj\text{-}sensor\_1}$ and an estimate $D_{obj\text{-}sensor\_2}$ are obtained based on the brightness and the size, respectively. Then, a sensor fusion method, such as, for example, a sensor fusion using extended Kalman filter, is used to combine $D_{obj\text{-}sensor\_1}$ and $D_{obj\text{-}sensor\_2}$ to obtain $D_{obj\text{-}sensor}$.

Figure 32:
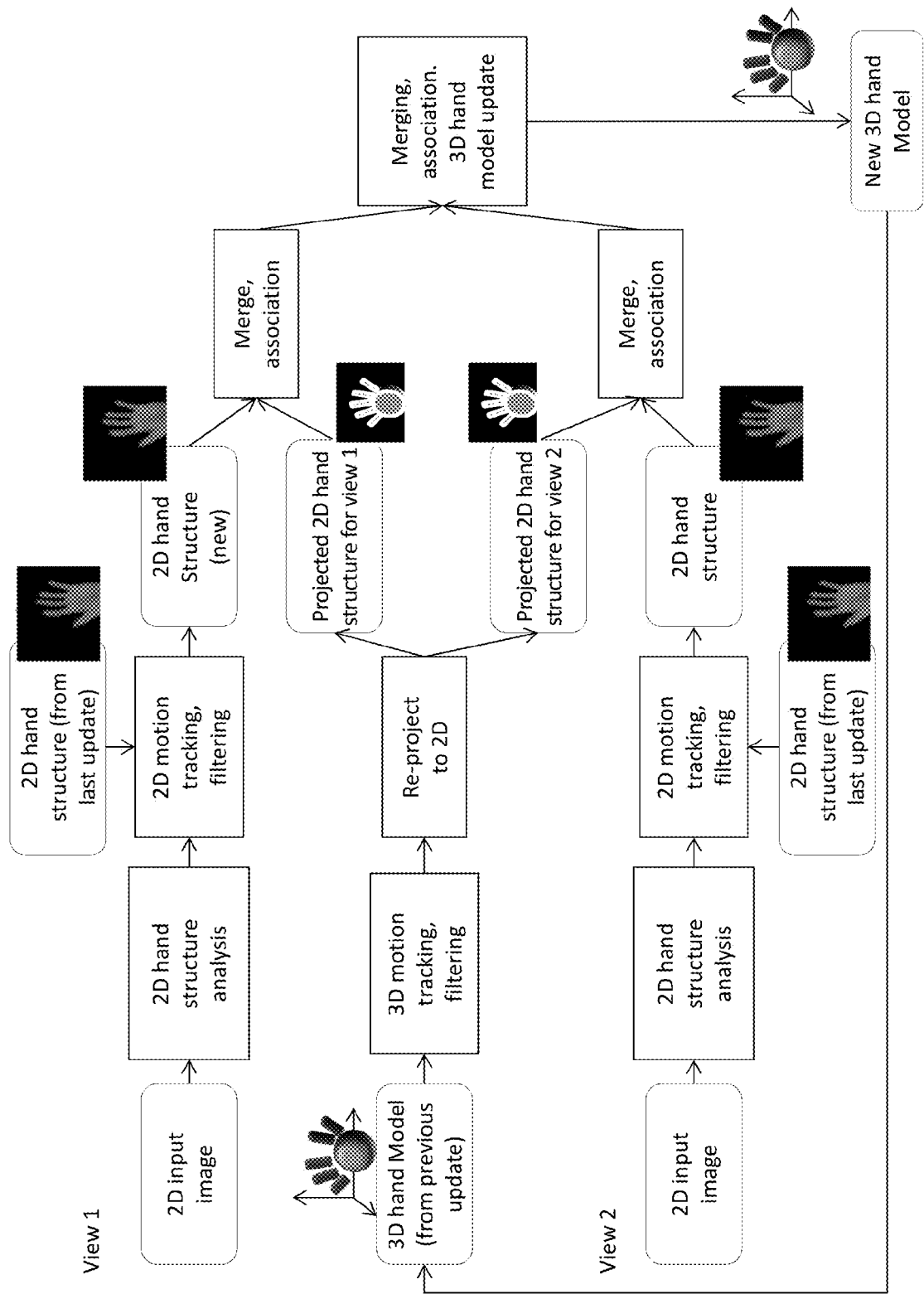
FIG. 32 shows a model based framework.

Consistent with embodiments of the disclosure, the model based framework may be suitable for any number of views, either one view or two or more views. FIG. 32 shows a scenario of two views. The details of the model based framework according to some embodiments is described below.

For each view, a 2D hand structure analysis (described in previous framework) is performed. The 2D hand structure analysis produces a 2D hand structure (also referred to as a new 2D hand structure), including a 2D hand skeleton. Similar to the finger skeleton, a hand skeleton refers to an abstraction of the structure of a hand.

Tracking is then applied by combining the last 2D hand structure (obtained during the last update) and the new 2D hand structure (obtained during the current update as described above). The tracking process includes: 1) apply a filter on previous results to "predict" a predicted 2D hand structure; 2) use the association method to combine the new 2D hand structure with the predicted 2D hand structure; and 3) update the filter using the combined new result. This tracking process could produce a smooth skeleton position, is resistant to a sudden loss of finger in a view, and could provide a consistent finger ID. As used in this disclosure, a finger ID refers to an ID assigned to a detected finger. Once a finger is assigned a finger ID, even if it becomes invisible in following updates, that finger will still carry the same finger ID. For example, in one update, a middle finger and an index finger are detected. The middle finger is assigned a finger ID "finger#1" and the index finger is assigned a finger ID "finger#2". They carry the assigned finger ID's throughout the process, even when one or both of them become invisible during later updates.

In some embodiments, filtering is applied on a 3D hand model to produce a smooth 3D result, including a 3D hand skeleton, which is re-projected to create a projected 2D hand skeleton on each view.

Then, for each view, the new 2D hand skeleton and the projected 2D hand skeleton are combined to obtain an association between finger IDs.

Then, 2D results of both views are combined to calculate a new 3D position of the hand and a new 3D finger skeleton. The final result is used as a new 3D hand model, which may be used in the next update.

As described above, the interactive system 100 may be used to recognize and track the 3D position and orientation, etc. of a foreground object (such as a hand or a finger). Using this feature, a user may interactive with the computer 104. For example, the user may click and move a finger on a surface of a desk or a table to control the cursor movement and click on the display 114, as if the user is using a mouse, without the use of an actual mouse, so as to use such a surface as a physical touch surface. With the interactive system 100, the user may also use the screen of the display 114 as if it is a touch screen, even if the screen of the display 114 is not an actual touch screen. Moreover, the user may specify a virtual surface in an open space (such as in the air) as a virtual touch surface, i.e., an imaginary touch surface. By moving the finger relative to the virtual touch surface, the user may interact with the computer 104 as if there is an actual touch surface at the position of the virtual touch surface. In addition, by combining with eye position tracking (detection of 3D positions of the user's eyes using, for example, head tracking technology), a direct correlation between the user's perceived finger position and the position on the screen of the display 114 may be created. Hereinafter, such an interaction is also referred to as a 2.5D touch interaction, and the surface, either a physical touch surface, a virtual touch surface, or a display screen, mentioned above for realizing the interaction is also referred to as a touch interactive surface. Consistent with embodiments of the disclosure, a 2.5D touch interaction may include information such as, for example, the 2D projected position of a foreground object, such as a finger tip, on the touch interactive surface, the distance between the foreground object, such as a finger tip, and the touch interactive surface, and the 3D direction of a foreground object, such as a finger, relative to the normal direction of the touch interactive surface.

Figure 33A:
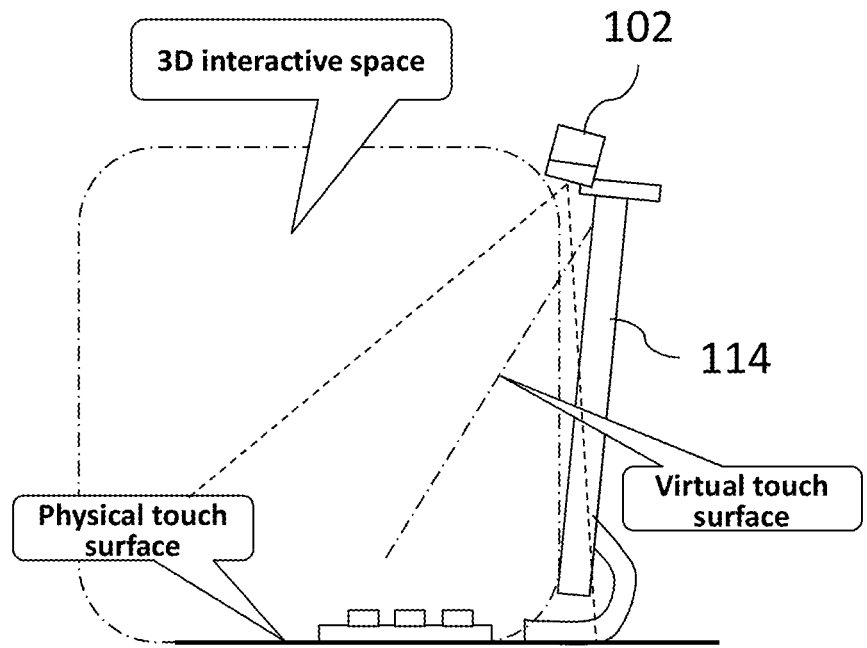
FIGS. 33A and 33B schematically show exemplary setups of a system according to exemplary embodiments and different types of touch interactive surfaces.
Figure 33B:
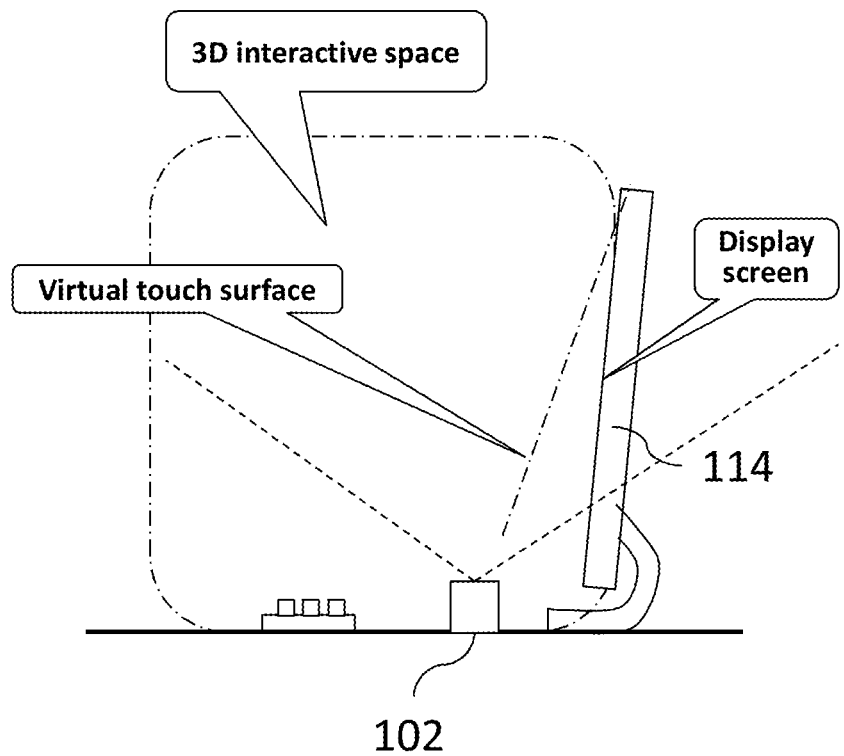

FIGS. 33A and 33B schematically show exemplary setups of the system and different types of touch interactive surfaces. In the example shown in FIG. 33A, the sensing device 102 is positioned above the table, such as, for example, above the display 114, and faces down. In some embodiments, the sensing device 102 may be clipped to the top of the display 114. For example, the sensing device 102 may be clipped at the center, the left, or the right of the top of the display 114. In some embodiments, the sensing device 102 may be placed on a stand-alone support, which holds the sensing device 102 above the table. In the example shown in FIG. 33B, the sensing device 102 is placed on the table and faces up. Besides interacting with the computer 104 via the interaction with a touch interactive surface, the user may also interact with the computer 104 via the interaction in the 3D interactive space shown in FIGS. 33A and 33B. Such an interaction may also be referred to as a 3D interaction.

Consistent with embodiments of the disclosure, the 2.5D touch interaction may be realized based on 3D information of a foreground object obtained as described above and by adding a hovering state of the foreground object to a standard touch interaction. The 2.5D touch interaction consistent with embodiments of the disclosure may provide the projected (x,y) position of the foreground object, such as, for example, a finger, on the touch interactive surface, as well as a distance between the foreground object and the touch interactive surface.

Figure 34:
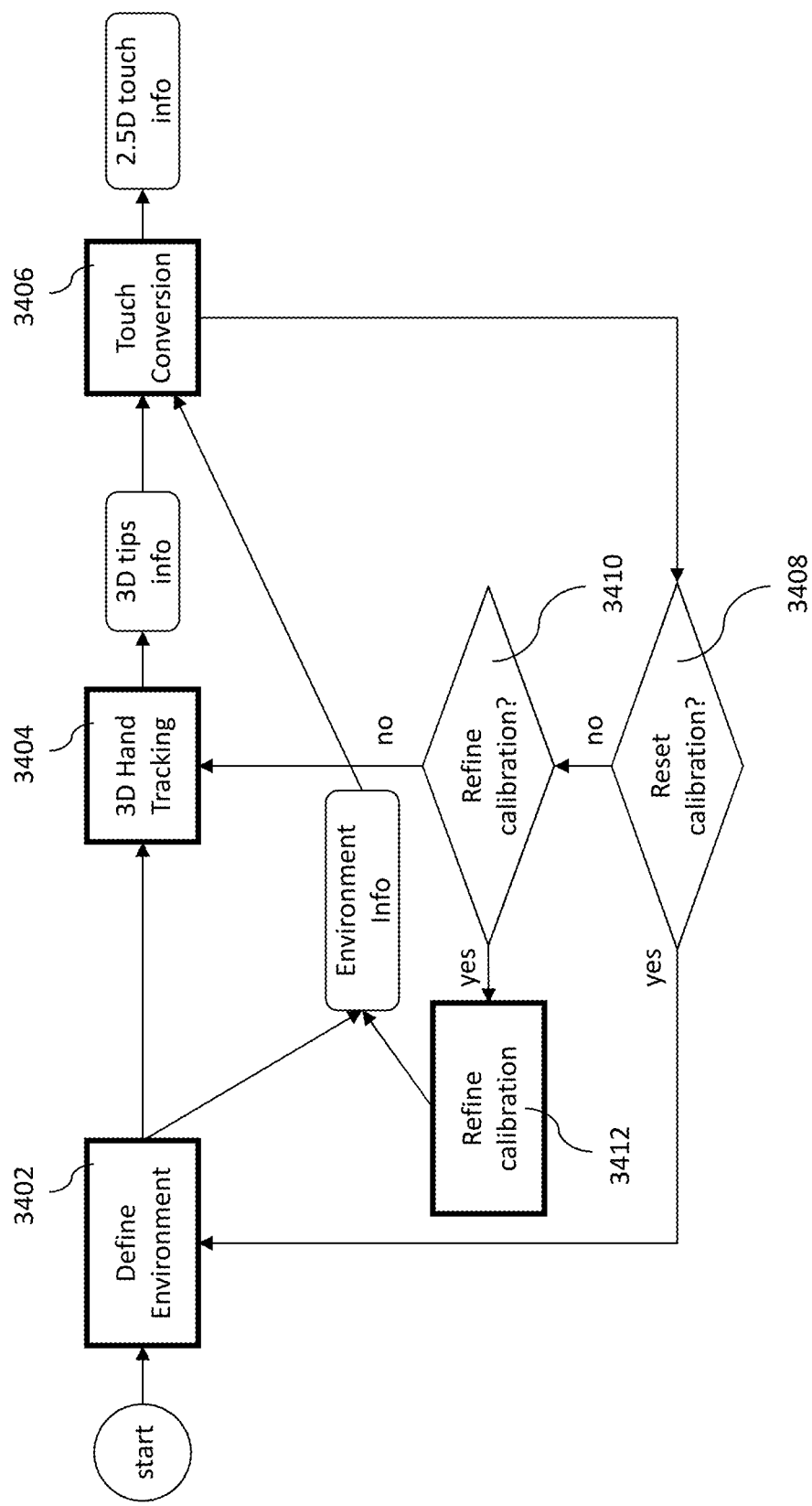
FIG. 34 is a high-level flow chart showing a process for enabling a 2.5D touch interaction according to an exemplary embodiment.

FIG. 34 is a high-level flow chart showing a process consistent with embodiments of the disclosure for enabling a 2.5D touch interaction using, for example, a hand. At 3402, the environment is defined to provide environment information, including automatically or manually defining a touch interactive surface in the environment. At 3404, 3D hand tracking is performed, to obtain 3D information of finger tips according to methods described earlier in this disclosure. At 3406, the 3D information is converted to 2.5D touch information. At 3408, it is determined whether calibration needs to be reset. If so, the process proceeds to 3402. If the calibration does not need to be reset, the process proceeds to 3410, where it is determined whether the calibration needs to be refined. If so, the process proceeds to 3412 to refine the calibration. If the calibration does not need to be refined, the process proceeds to 3404. In some embodiments, when surface changes are detected, the calibration may be reset or refined automatically. In some embodiments, the user may manually force to reset or refine the calibration.

Figure 35:
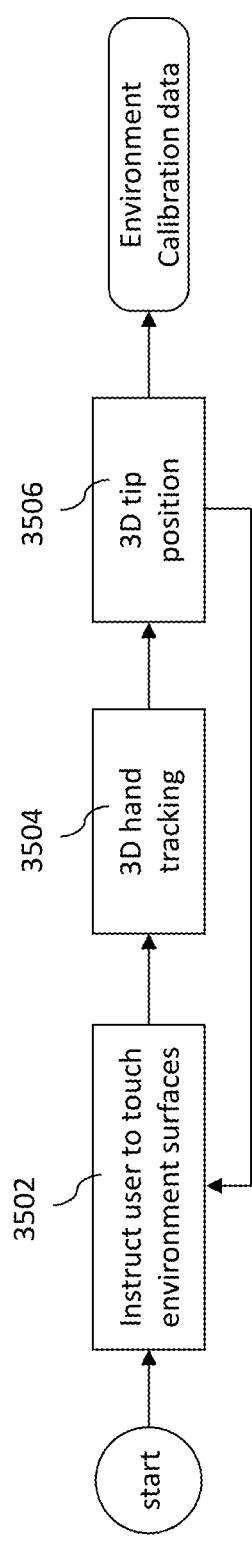
FIG. 35 is a high-level flow chart showing a process for manually calibrating a touch interactive surface according to an exemplary embodiment.

FIG. 35 is a high-level flow chart showing a process consistent with embodiments of the disclosure for manually calibrating a touch interactive surface. At 3502, the interactive system 100 instructs the user how to manually calibrate a touch interactive surface. The instructions may be delivered, for example, via a GUI displayed on the screen of the display 114 or via an audio device, such as a speaker. The instructions instruct the user to move a finger to a certain position on a surface and hold steady for a certain period of time. The 3D position of the user's finger or finger tip is then detected (3504) and recorded (3506). Then the process returns to 3502 to instruct the user to move the finger to another position on the surface. The process is repeated until the calibration process is finished. The recorded 3D positions of all calibration touch points are then used to define the touch interactive surface.

In some embodiments, three calibration touch points may be enough to define the touch interactive surface. In some embodiments, four or more touch points may be used to define the touch interactive surface. Using four or more touch points may increase the accuracy when the user tries to define a physical surface as the touch interactive surface. Moreover, using four or more touch points may also allow the user to define a non-planar surface as the touch interactive surface.

Figure 36:
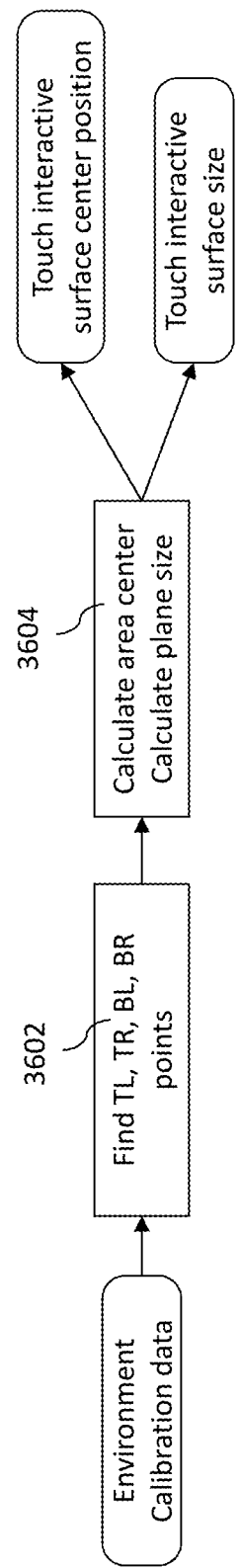
FIG. 36 shows a process for defining an effective interaction area according to an exemplary embodiment.
Figure 37:
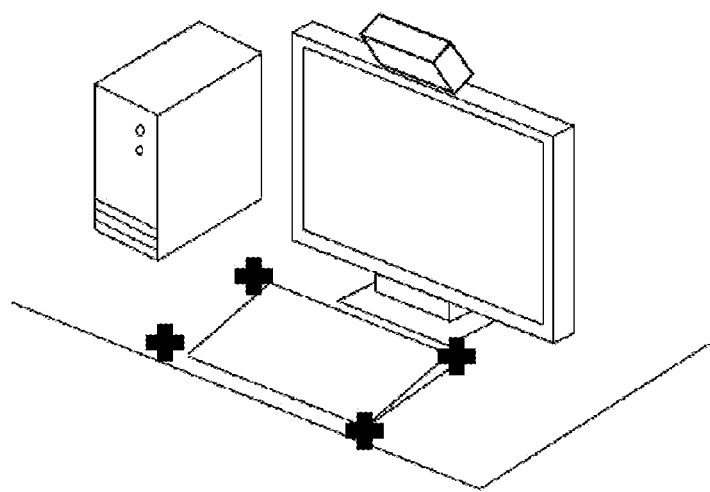
FIG. 37 shows a result of defining corner points of a touch interactive surface according to an exemplary embodiment.

Since the defined touch interactive surface may be large, the interactive system 100 also allows the user to define an effective interaction area, which may then be mapped to the size of the screen of the display 114. This process is shown in FIG. 36. At 3602, the environment calibration data, including the 3D positions of the calibration touch points, is input and analyzed to find top-left (TL), top-right (TR), bottom-left (BL), and bottom-right (BR) points, as schematically shown in FIG. 37. At 3604, an area center and a plane size are calculated to obtain a size of the touch interactive surface and a center position of the touch interactive surface.

Consistent with embodiments of the disclosure, the touch interactive surface may be automatically and progressively detected by detecting the action of the user's finger hitting a surface. That is, the interactive system 100 detects events of the user's finger tapping a hard surface and automatically registers these tapping events. The interactive system 100 stores the 3D position of the finger tip in a touch-surface-calibration database when a tapping event occurs. In some embodiments, the interactive system 100 may dynamically repeat the calibration process to enhance the understanding of the surfaces in the environment. Using this method, the user may simply tap on a surface for multiple times at different places and the interactive system 100 would automatically calibrate the surface. Therefore, the interactive system 100 does not need to show instructions to guide the user, and the user does not need to wait for the interactive system 100 to tell him when to put the finger on the surface or when to move to another place on the surface. Moreover, after the calibration phase, when the user is using the input device as normal, the interactive system 100 continues to monitor tapping events and update the surface calibration when needed. Therefore, recognition of the touch interactive surface becomes more and more accurate during the user's continuous use. Moreover, when the environment has changed (e.g., the existing surface is removed, or a new surface is placed), the interactive system 100 automatically updates the touch interactive surface, by merging new tapping events with existing database.

Figure 38A:
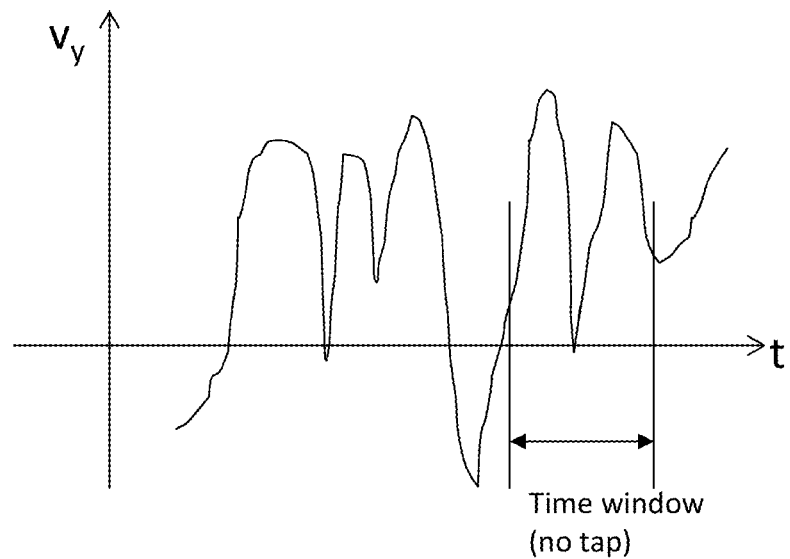
FIGS. 38A and 38B show a finger's 3D velocity when the finger is moving in the air and when the finger hits a solid surface, respectively.
Figure 38B:
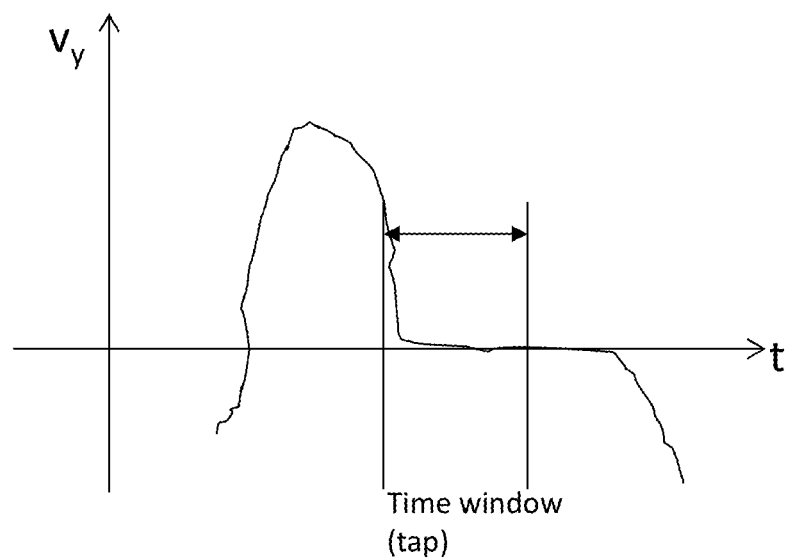

Below, a method for detecting a tapping event is described. Consistent with embodiments of the disclosure, 3D position of the user's finger is tracked and a time-dependent position value is recorded. To detect a tapping event, the time-dependent position value is converted to a speed value by differentiation. FIGS. 38A and 38B show a finger's 3D velocity when the finger is moving in the air and when the finger hits a solid surface, respectively. In FIGS. 38A and 38B, only the velocity component in the y direction is shown. The velocity components in the x and z directions may also be depicted in a similar manner.

In some embodiments, a moving window is used to detect the following conditions: 1) the speed drops from a high value (higher than a first speed threshold) to a very small value (lower than a second speed threshold close to zero) within a very short period of time (shorter than a first time threshold), and 2) the speed keeps at the very small value for a time period longer than a certain period of time (longer than a second time threshold). If both conditions are satisfied, then it is determined that a tapping event has occurred.

When the user's finger hits a hard surface, sometimes the finger may continue to slide on the surface instead of coming to a full stop. In such situation, a tapping event is determined as having occurred if the following two conditions are satisfied: 1) a sudden change of finger speed in the original traveling direction is detected, and 2) the following movement of the finger is constrained in a 2D plane. This can be calculated by applying a dimension reduction method, e.g., Principal component analysis (PCA), on the 3D position data of the finger in the time window to map the trajectory from a physical 3D coordinate into a new 3D coordinate. The PCA algorithm produces the new 3D coordinate system by analyzing the 3D position data of the finger. The new 3D coordinate system is defined by three axes. Every axis in the new 3D coordinate system has an eigenvalue, related to the amount of variation of the data points along that axis. Among the three axes, the one having the smallest eigenvalue is referred to as a "minimum axis." If the speed value in the minimum axis keeps very low (lower than a certain speed threshold) for a relatively long period of time (longer than a certain time threshold), then the time at which the sudden change of finger speed occurs is registered as a time at which a tapping event occurs.

When a new tapping event is detected, the position at which the new tapping occurs (referred to as new tapping position) is used to update the existing touch sensitive surface. Consistent with embodiments of the disclosure, if the new tapping position is consistent with the existing touch interactive surface, the new tapping position is used to increase the resolution and accuracy of the existing touch interactive surface. If the new tap position conflicts with the existing touch interactive surface (which may mean that the user has slightly moved the surface), the existing touch interactive surface is updated using the new tapping position or the existing touch interactive surface is deleted. If the new tapping position is not associated with the existing touch interactive surface, a new touch interactive surface is created.

FIG. 39 is a flow chart showing a process consistent with embodiments of the disclosure for automatically detecting a touch interactive surface by detecting markers. The markers may be created using methods described above in this disclosure. As shown in FIG. 39, at 3902, a user places a piece of sheet with such markers in the environment, for example, on a table. At 3904, the interactive system 100 takes images of the sheet using the imaging sensors 304, and recognizes the markers. In some embodiments, the interactive system 100 records 3D positions of the markers in the images. At 3906, the interactive system 100 calculates the 3D position, orientation, and size of the sheet based on the 3D positions of the markers. The calculation results are saved as touch interactive surface calibration data.

Figure 41:
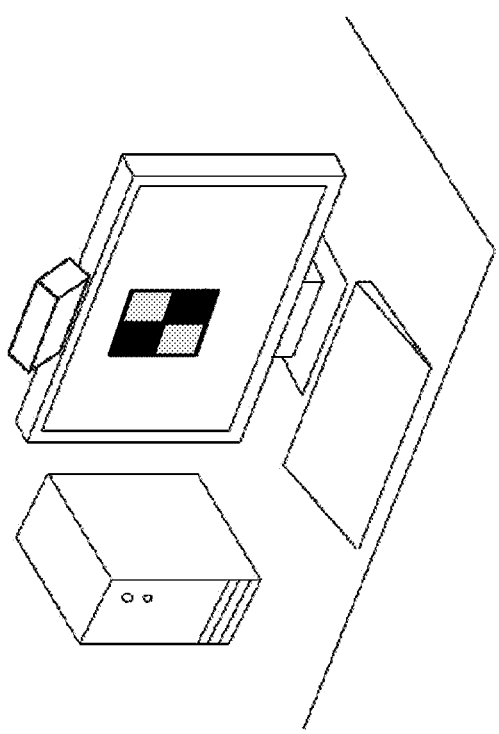
FIG. 41 schematically shows a 2D code shown on a display screen.

FIG. 40 is a flow chart showing a process consistent with embodiments of the disclosure for automatically detecting and calibrating a display screen, such as the screen of the display 114, and making the display screen the touch interactive surface. As shown in FIG. 40, at 4002, the interactive system 100 displays a 2D code, such as a checker board, on the display screen, such as shown in FIG. 41. At 4004, the interactive system 100 takes images using different imaging sensors 304. At 4006, the interactive system 100 recognize the markers in the 2D code, and record the 2D positions of the markers in each image. At 4008, the interactive system 100 calculates the 3D positions, orientations, and sizes of the markers, and derives and records the size, 3D position, and 3D orientation of the display screen. At 4010, the interactive system 100 displays the surface position, direction, and size. Later, the interactive system 100 can detect the user's touch interaction on the display screen.

Figure 42:
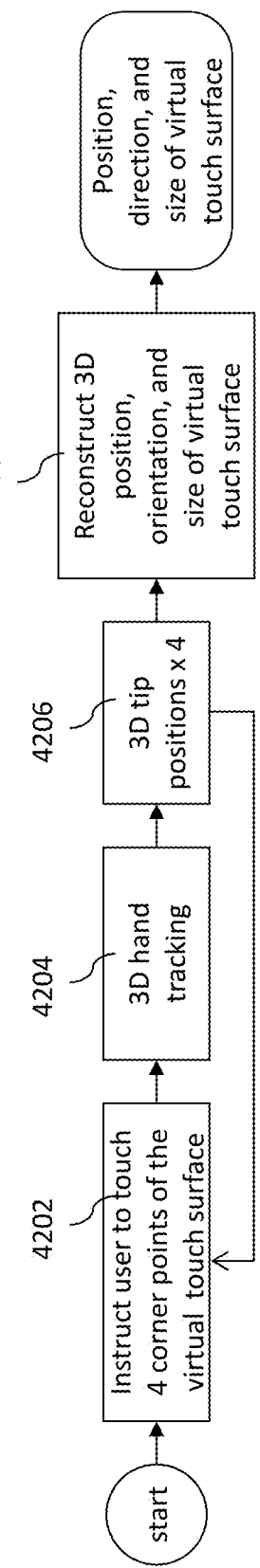
FIG. 42 is a flow chart showing a process for defining a virtual touch surface according to an exemplary embodiment.
Figure 43:
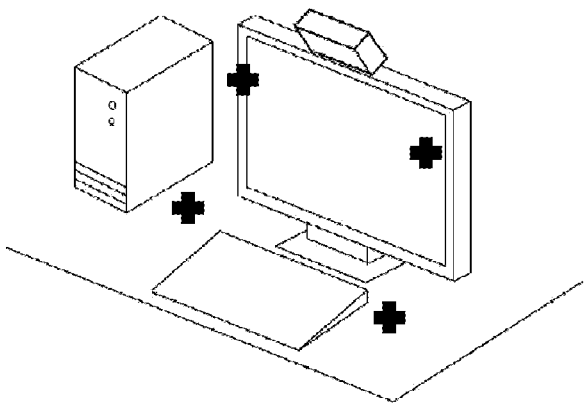
FIG. 43 schematically shows corner points of a desired virtual touch surface.

FIG. 42 is a flow chart showing a process consistent with embodiments of the disclosure for defining a virtual touch surface. The virtual touch surface may be defined over the keyboard and between the user and the display screen, and the user may interact in the air with the virtual touch surface to control the computer 104. As shown in FIG. 42, at 4202, the interactive system 100 instructs the user to "touch" four corner points of the desired virtual touch surface, as schematically shown in FIG. 43. At 4204, the interactive system 100 detects the 3D position of the user's hand. At 4206, the interactive system 100 records the positions of the four corner points. At 4208, the interactive system 100 calculates and record the size, 3D position, and 3D orientation of the virtual touch surface.

As compared to a physical touch screen on a computer monitor, the virtual touch surface has certain advantages. For example, for laptop and desktop PC users, the distance to the touch screen is far, and the angle is close to vertical (70 degree~80 degree). At such distance and angle, the screen is not suitable for touching—hard to reach and easy to cause fatigue. On contrast, the virtual touch surface consistent with embodiments of the disclosure may be defined to be closer to the user and at an angle that is easy to operate.

As discussed above, the interactive system consistent with embodiments of the disclosure may be used to realize a 2.5D touch interaction. Details of the 2.5D touch interaction are described below.

In some embodiments, the user's hand is used as the foreground object. The interactive system 100 uses the 3D tracking information of the hand (such as, for example, the 3D positions of finger tips and the 3D cylinder direction and length information of fingers) and the environment calibration data to perform a 3D to 2.5D conversion, so as to obtain 2D information such as, for example, a distance from a finger tip to a touch interactive surface defined according to, e.g., methods described above, and the direction of a finger relative to the normal of the touch interactive surface.

Figure 44:
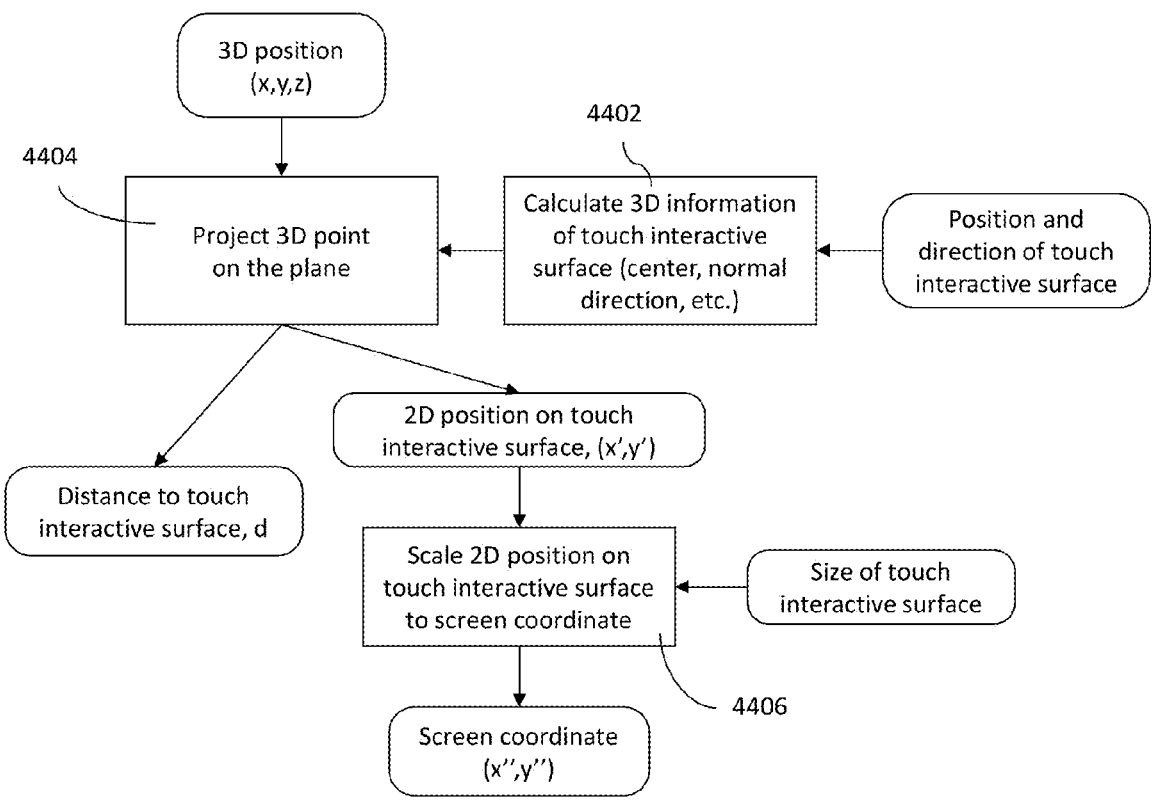
FIG. 44 is a flow chart showing a process for converting 3D information of a foreground object to 2.5D information according to an exemplary embodiment.

FIG. 44 is a flow chart showing an exemplary process consistent with embodiments of the disclosure for converting 3D information of a foreground object, such as, for example, a hand or a finger, to 2.5D information. At 4402, 3D information of the touch interactive surface is calculated based on the position and direction of the touch interactive surface. The 3D information of the touch interactive surface may include, for example, center of the touch interactive surface and the direction of the normal of the touch interactive surface. At 4404, the 3D position (x,y,z) of the foreground object is projected to the touch interactive surface, which includes the calculation of, for example, a distance d from the foreground object to the touch interactive surface and a 2D position of the projection point on the touch interactive surface. The 2D position of the projection point on the touch interactive surface may be expressed as using coordinates x' and y' in a 2D coordinate system defined on the touch interactive surface. At 4406, the 2D position (x',y') of the projection point on the touch interactive surface and the size of the touch interactive surface are used to scale the 2D position (x',y') of the projection point on the touch interactive surface to a 2D position (x",y") in a 2D coordinate system defined on the screen of the display 114. As a result of the above process, the 3D position (x,y,z) of the foreground object is converted to a 2D position (x",y") on the screen of the display 114 and a distance d between the foreground object and the touch interactive surface.

Figure 45:
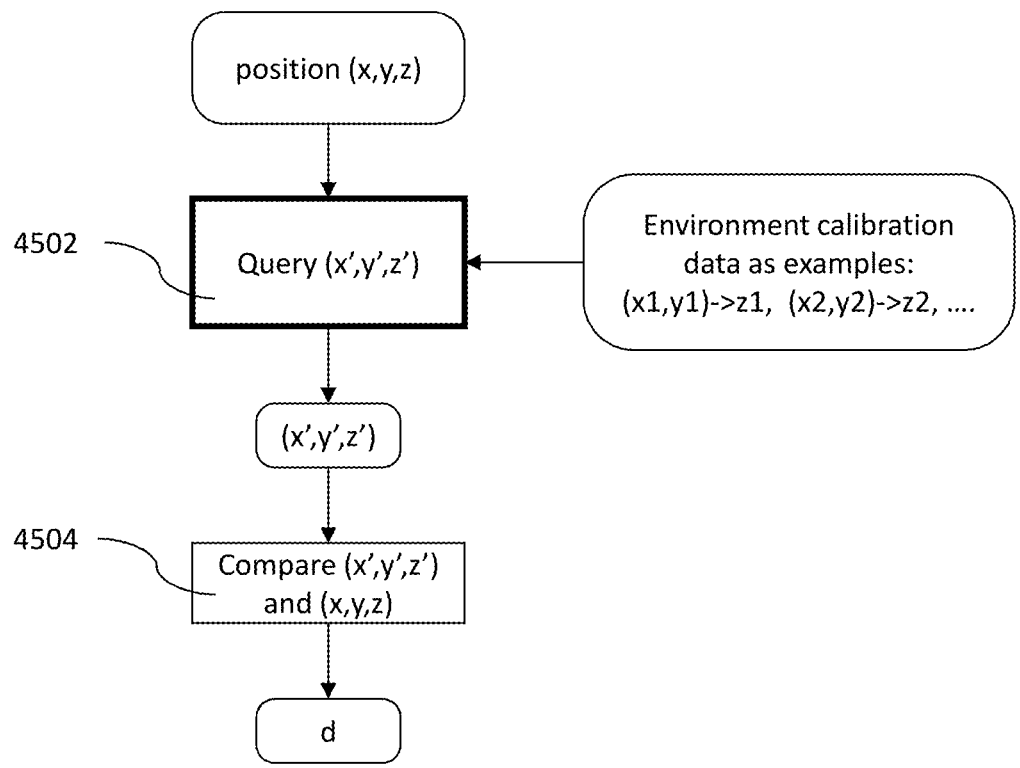
FIG. 45 is a flow chart showing a process for determining the distance d between a foreground object and a touch interactive surface.

FIG. 45 is a flow chart showing an exemplary process consistent with embodiments of the disclosure for determining the distance d between the foreground object and the touch interactive surface. As described above, during the environment calibration stage, environment calibration data is recorded, including positions of calibration points for defining the touch interactive surface, i.e., P1(x1,y1,z1), P2(x2,y2,z2), etc. At 4502, such environment calibration data and 3D position of the foreground object (x,y,z) are used to find a point having a position (x',y',z') on the touch interactive surface that is the closest to the foreground object. Position (x',y',z') is then compared with position (x,y,z) to determine the distance d (4504).

Figure 46:
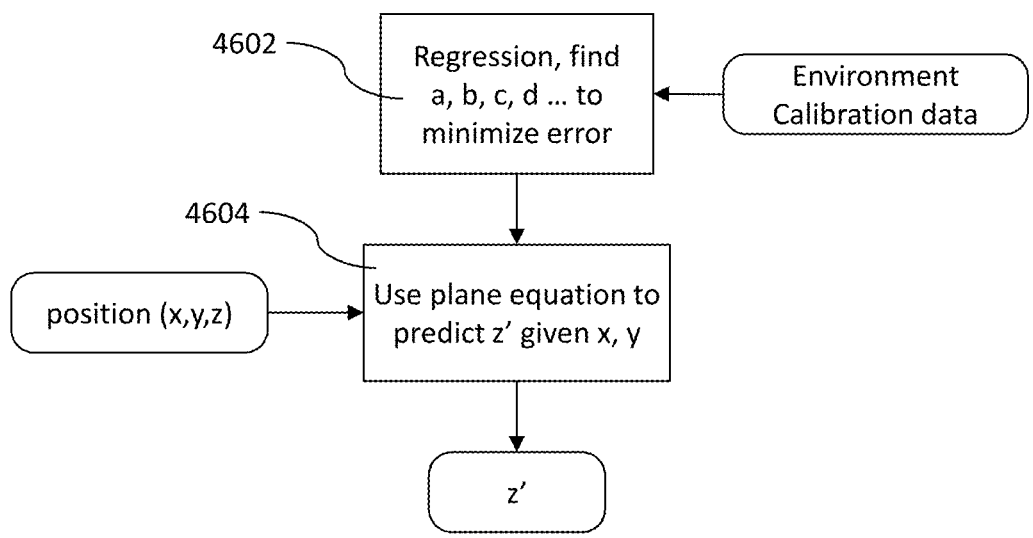
FIG. 46 is a flow chart showing a process for finding z' according to an exemplary embodiment.

FIG. 46 is a flow chart showing a process according to exemplary embodiments of the disclosure for finding z'. In the example shown in FIG. 46, the touch interactive surface may be approximated using a polynomial surface fitting equation:

$$a*x+b*y+c*z+d+e*x\char`\^2+f*y\char`\^2+\ldots=0 \quad (4)$$

At 4602, the positions of all the calibration points are plugged into the following error function to find an error value:

$$err=sum[sqr(a*x+b*y+c*z+d+e*x\char`\^2+f*y\char`\^2+\ldots)] \quad (5)$$

In some embodiments, a regression method is used to find best values for parameters a, b, c, d, e, f . . . that minimize the error value "err". At 4604, the x, y coordinates of the foreground object (which has a 3D position of (x,y,z)) are plugged into the polynomial surface fitting equation to calculate z' at given x and y.

Figure 47:
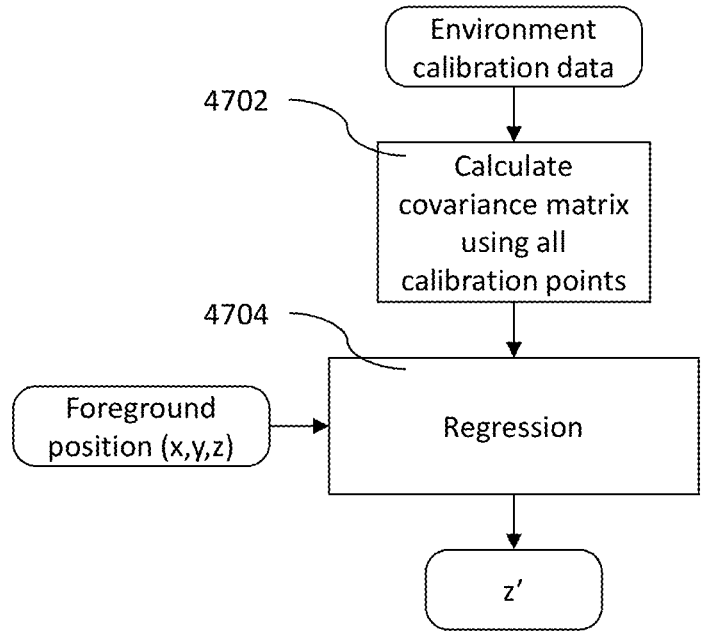
FIG. 47 is a flow chart showing a process for finding z' according to an exemplary embodiment.

FIG. 47 is a flow chart showing a process according to exemplary embodiments of the disclosure for finding z'. In the example shown in FIG. 47, a machine learning method using Gaussian process regression is used. As shown in FIG. 47, at 4702, a covariance matrix is calculated using the 3D positions of all calibration points. At 4704, a regression is used to project the query point, i.e., the foreground object, onto the touch interactive surface and to obtain z'. The method shown in FIG. 47 may be suitable for scenarios where the touch interactive surface is irregular, i.e., the touch interactive surface is not a flat plane or not close to a flat plane, or where the environment measurement data is not very uniform.

Figure 48:
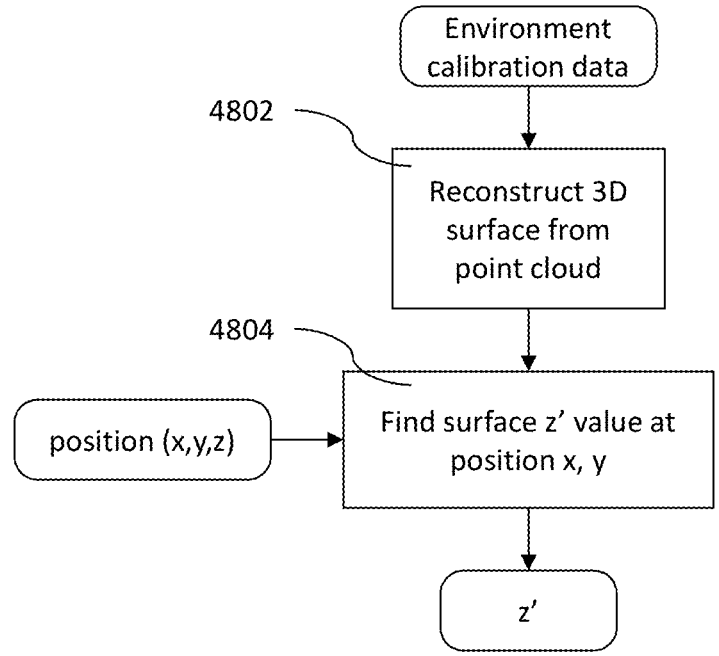
FIG. 48 is a flow chart showing a process for finding z' according to an exemplary embodiment.

FIG. 48 is a flow chart showing a process according to exemplary embodiments of the disclosure for finding z'. In the example shown in FIG. 48, a surface point cloud method is used. At 4802, 3D touch interactive surface is reconstructed from a point cloud based on the environment calibration data. At 4804, surface z' value at position (x,y) is calculated based on the reconstructed surface.

Figure 49:
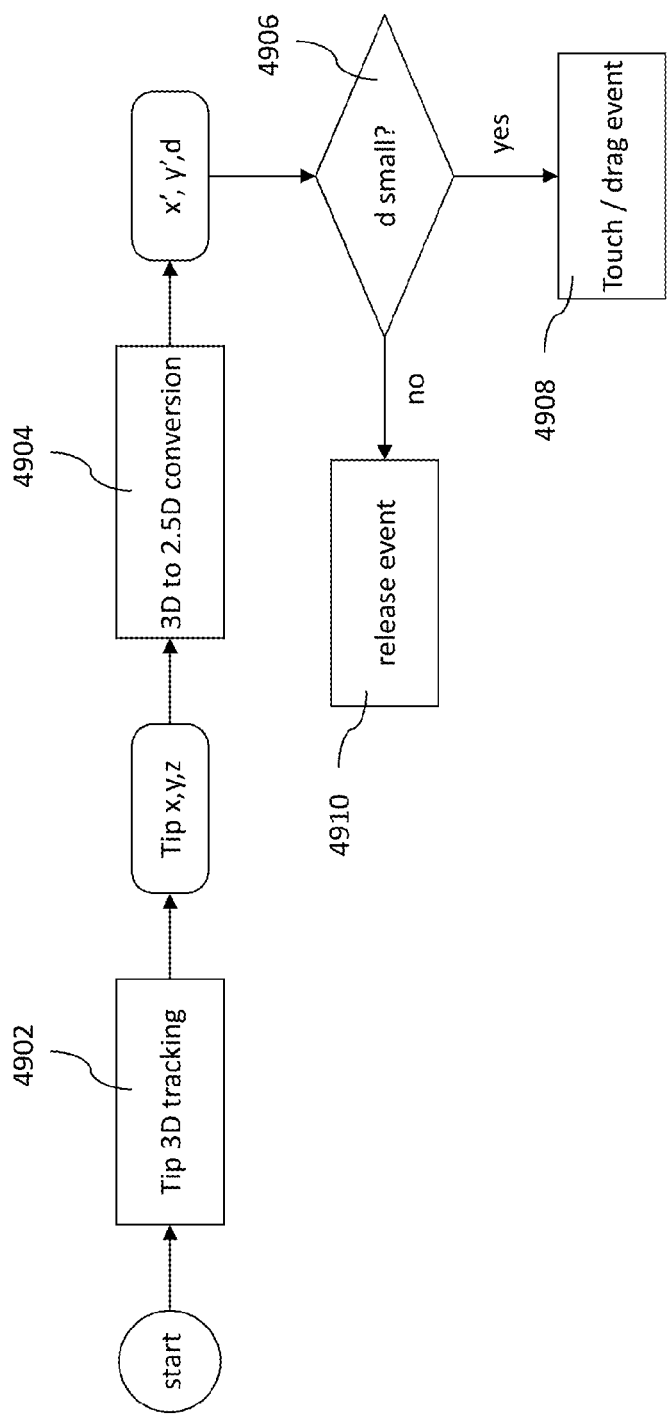
FIG. 49 shows a process for finger writing using the touch interactive surface.

The 2.5D information obtained according to embodiments consistent with the disclosure, such as those described above, may be used in various applications. For example, FIG. 49 shows a process for finger writing using the touch interactive surface. At 4902, 3D position of a finger tip is tracked. At 4904, the acquired 3D position (x,y,z) of the finger tip is converted to 2.5D information x', y', and d. At 4906, it is determined whether d is smaller than a threshold distance. If yes, a touch/drag event is recorded (4908). If d is not smaller than the threshold distance, the event is released (4910).

Figure 50:
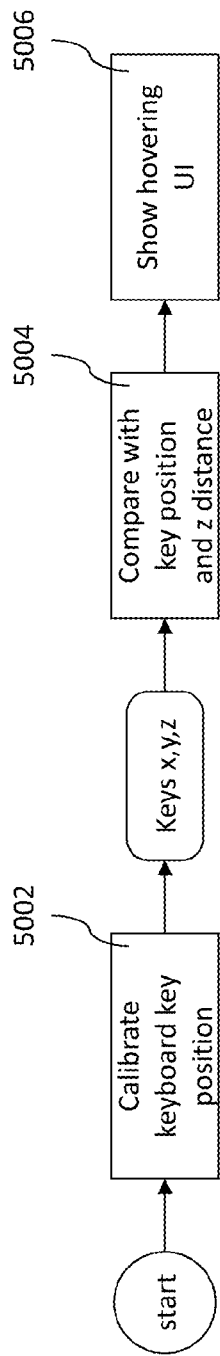
FIG. 50 shows a process for showing hover of a foreground object.

FIG. 50 shows a process for showing hover of a foreground object, such as the user's finger, over a key on a keyboard. At 5002, keys on the keyboard are recognized and each key's 3D position is detected and recorded. At 5004, the 3D position of the user's finger is compared with the positions of the keys to determine over which key the finger is hovering and the distance between the finger and that key. At 5006, a UI is displayed on the screen of the display 114 to show that the finger is hovering on that key and how far the finger is away from that key.

As described above, the interactive system 100 can track the position of a user's hand or finger. In some embodiments, the interactive system 100 also tracks the position of the user's eye, and combine the information about the position of the eye and the information about the position of the hand or finger for 3D/2D input.

Consistent with embodiments of the disclosure, the interactive system 100 can detect the 3D position of the user's eye in a manner similar to that described above for detecting the 3D position of the user's hand or finger. The information about the eye, the hand or finger, and the screen of the display 114 is correlated to create a "3D and 2D direct manipulation" interaction. As used in this disclosure, a "direct manipulation" refers to a manipulation that allows the user to directly manipulate objects presented to them. From the user's eye's point of view, the position of the hand or finger is the same as the position of the object being manipulated, which is displayed on a screen, e.g., a 2D position of an object presented by a conventional display device or a 3D position of an object presented by a 3D display.

Figure 51:
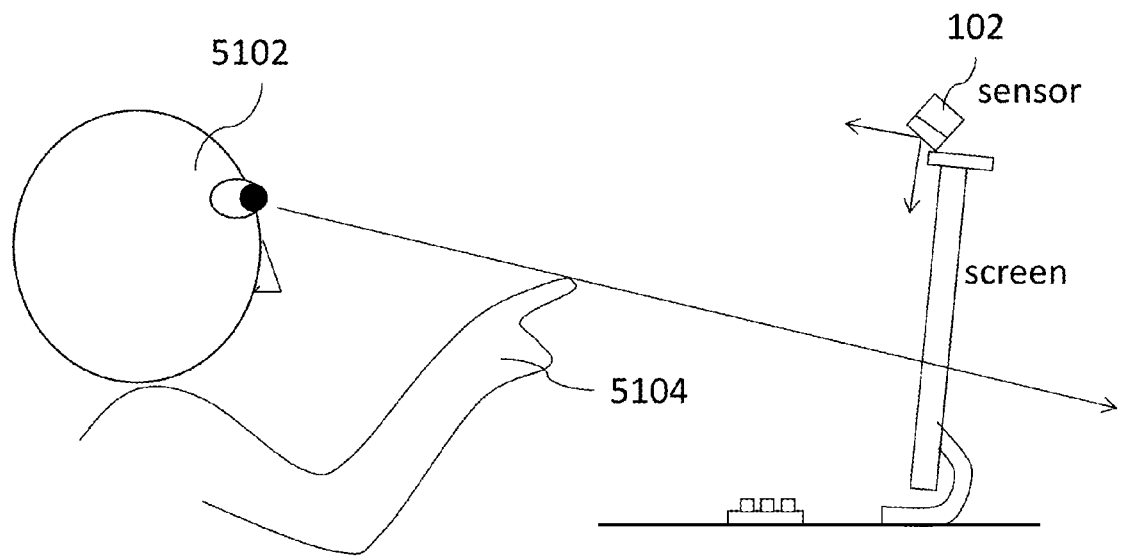
FIG. 51 schematically shows a setup of an interactive system according to an exemplary embodiment.

FIG. 51 schematically shows a setup consistent with embodiments of the disclosure. As shown in FIG. 51, the sensing device 102 is placed to face the user, and may capture images including both the user's head 5102 and the hand 5104.

With the head tracking and the hand tracking combined, the user can interact with a content on a 2D screen or with a content on a 2D screen via a virtual touch surface. The user can also interact with a 3D content presented by a 3D display. Moreover, a head mounted 3D display (HMD) may be realized.

Figure 52:
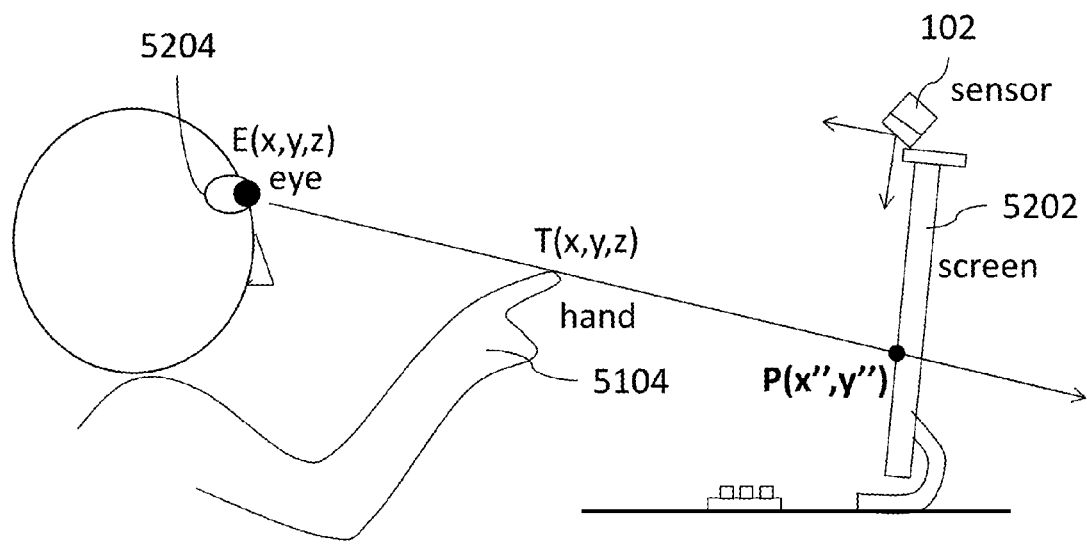
FIG. 52 schematically shows a scenario where a user interacts with a content on a 2D physical screen.

FIG. 52 schematically shows a scenario where the user interacts with a content on a 2D physical screen 5202. In some embodiments, the face recognition and tracking method is used to recognize the 3D position of the eye 5204, E(x,y,z), in the coordinates of the sensing device 102. The hand tracking method, such as one of those described above, is used to recognize the 3D position of the hand 5104, T(x,y,z), in the coordinates of the sensing device 102 and the action of the hand 5104. As described above, during the calibration phase, the interactive system 100 detects and records 3D information of the screen 5202 in the coordinates of the sensing device 102. Such information may include, for example, the 3D position and 3D orientation of the screen 5202, the dimension (e.g., width and height) of the screen 5202. Such information may alternatively or additionally include, for example, the 3D positions of the four corners of the screen 5202: UpperLeft (x,y,z), UpperRight(x,y,z), BottomLeft(x,y,z), and Bottom Right(x,y,z). With the 3D positions of the eye 5204 and the hand 5104, E(x,y,z) and T(x,y,z), a line extending from the 3D position of the eye 5204 and the 3D position of the hand 5104 is created. An intersection point I(x,y,z) of this line intersecting with the screen 5202 is calculated. The coordinates of the intersection point I(x,y,z) can be translated to the 2D coordinates of the screen 5202. As a result, a 2D intersection position P(x'',y'') expressed using the 2D coordinates of the screen 5202 is obtained. Information about the user's action at position P(x'',y'') is sent to the operating system or the applications.

Figure 53:
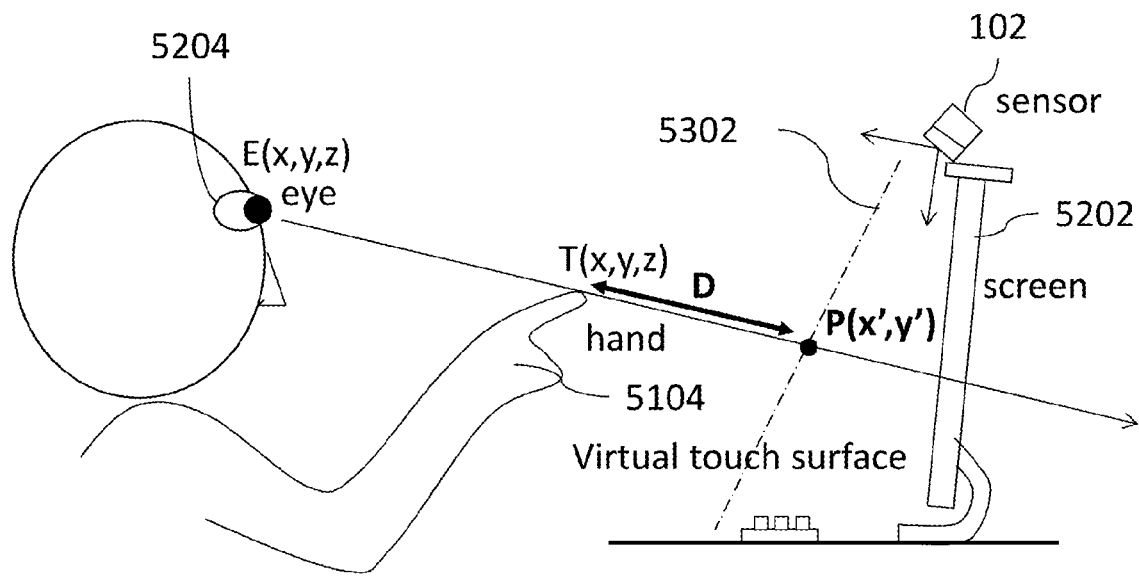
FIG. 53 schematically shows a scenario where a user interacts with a content on a 2D physical screen via a virtual touch surface.

FIG. 53 schematically shows a scenario where the user interacts with a content on a 2D physical screen 5202 via a virtual touch surface 5302, such as a virtual touch surface defined according to methods consistent with embodiments of the disclosure, as described above. The calculations in this scenario are similar to those in the scenario described with respect to FIG. 52, except that the 2D intersection position P(x',y') of the line connecting the eye 5204 and the hand 5104 intersecting with the virtual touch surface 5302 is calculated and recorded, which is expressed using the 2D coordinates of the virtual touch surface 5302. In addition, the distance D between the hand 5104 and the virtual touch surface 5302 is calculated and reported to the operating system or the applications.

Figure 54:
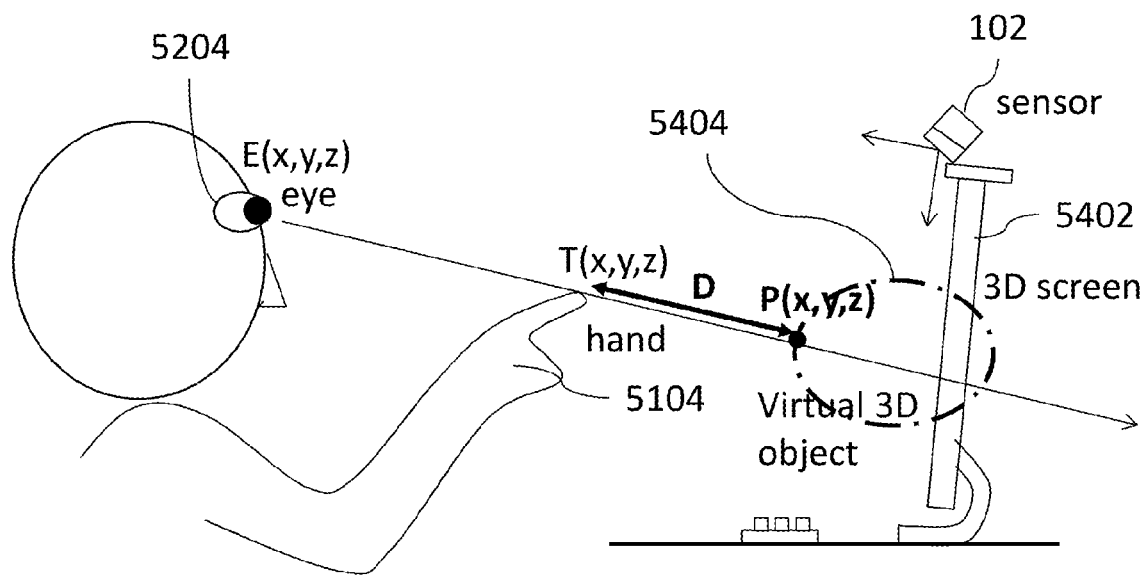
FIG. 54 schematically shows a scenario where a user interacts with a 3D content presented by a 3D display screen.

FIG. 54 schematically shows a scenario where the user interacts with a 3D content presented by a 3D display screen 5402, such as a virtual 3D object 5404. In some embodiments, the interactive system 100 uses a face recognition and tracking algorithm to recognize the 3D position of the eyes, E(x,y,z), in the coordinates of the sensing device 102. The hand tracking method, such as one of those described above, is used to recognize the 3D position of the hand 5104, T(x,y,z), in the coordinates of the sensing device 102 and the action of the hand 5104. During the calibration phase, the interactive system 100 detects and records 3D information of the screen 5402 in the coordinates of the sensing device 102. Such information may include, for example, the 3D position and 3D orientation of the screen 5402, the dimensions (e.g., width and height) of the screen 5402. The interactive system 100 converts the 3D position of the eye 5204 from the coordinates of the sensing device 102 to coordinates used by the screen 5402 to render the virtual 3D object 5404, Es(x,y,z), and sends this information to the operating system and a 3D interactive application. The 3D interactive application renders the virtual 3D object 5404 according to the 3D position Es(x,y,z) of the user's eye 5204. In addition, the interactive system 100 converts the 3D position of the hand 5104 from the coordinates of the sensing device 102 to coordinates used by the screen 5402 to render the virtual 3D object 5404, Ts(x,y,z), and sends this information to the operating system and the 3D interactive application. The 3D interactive application uses the Ts(x,y,z) information to allow the user to interact with the virtual 3D object 5404.

Figure 55:
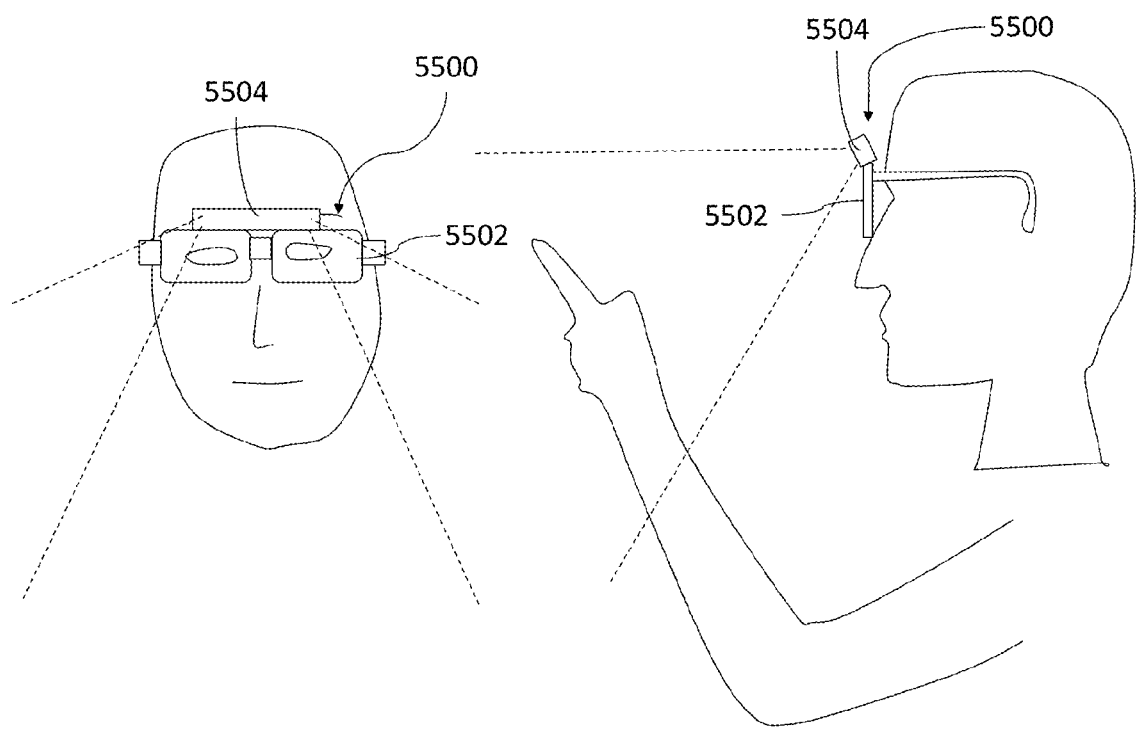
FIG. 55 shows a head-mounted 3D display (HMD) system according to an exemplary embodiment.

A system consistent with embodiments of the disclosure may also include a head mounted 3D display (HMD), which enables virtual reality interaction, such as, for example, interaction with a virtual touch surface, interaction with a virtual 3D object, or virtual Interaction with a physical 3D object. FIG. 55 shows an HMD system 5500 consistent with embodiments of the disclosure. The HMD system 5500 includes a pair of HMD glasses 5502 and a sensing device 5504 coupled to the HMD glasses 5502. The sensing device 5504 may be mounted on the top, the bottom, the left, or the right of the HMD glasses 5502. In some embodiments, the sensing device 5504 has a separate body design, and imaging sensors of the sensing device 5504 are mounted on different places of the HMD glasses 5502.

With the HMD system 5500, the user may interact with a fixed 2D display in a manner similar to those described above with respect to the scenario where an HMD is not used.

Figure 56:
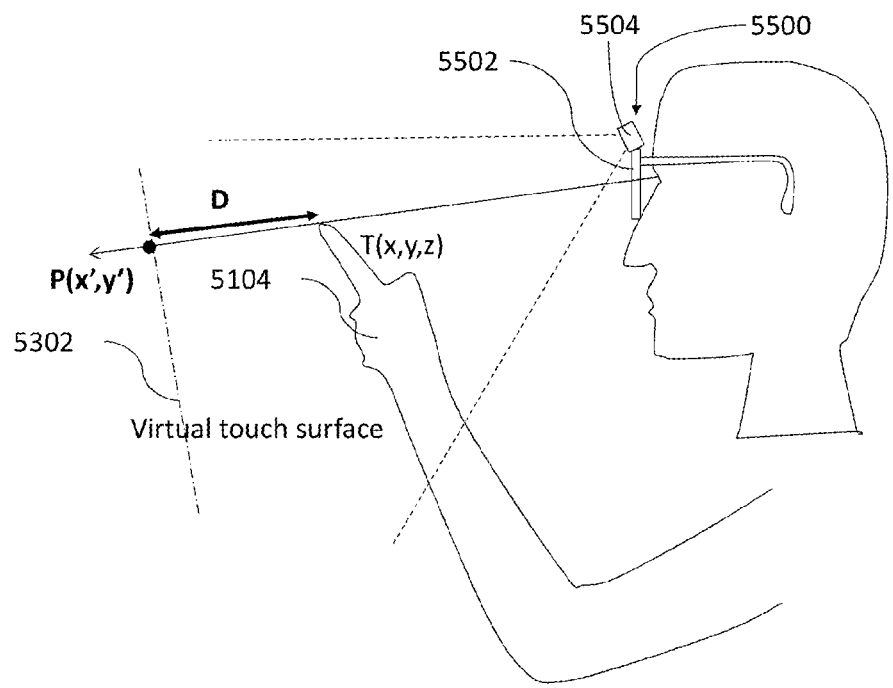
FIG. 56 shows a scenario where a user interacts with a virtual touch surface.
Figure 57:
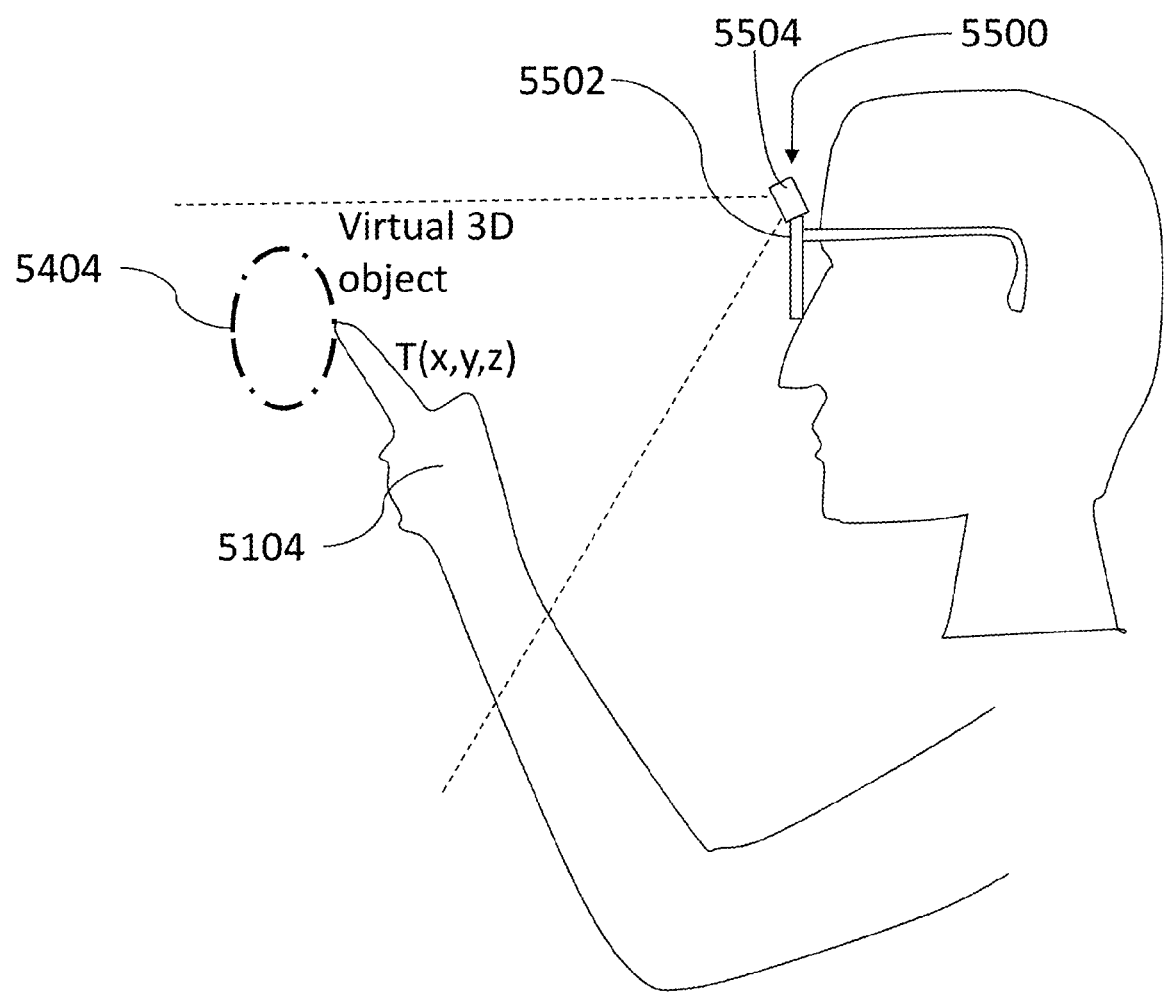
FIG. 57 shows a scenario where a user interacts with a virtual 3D object rendered by the HMD system.

FIGS. 56 and 57 respectively show the scenario where the user interacts with a virtual touch surface and the scenario where the user interacts with a virtual 3D object rendered by the HMD system 5500. The methods with respect to these scenarios are similar to those described above with, e.g., FIGS. 53 and 54.

Figure 58:
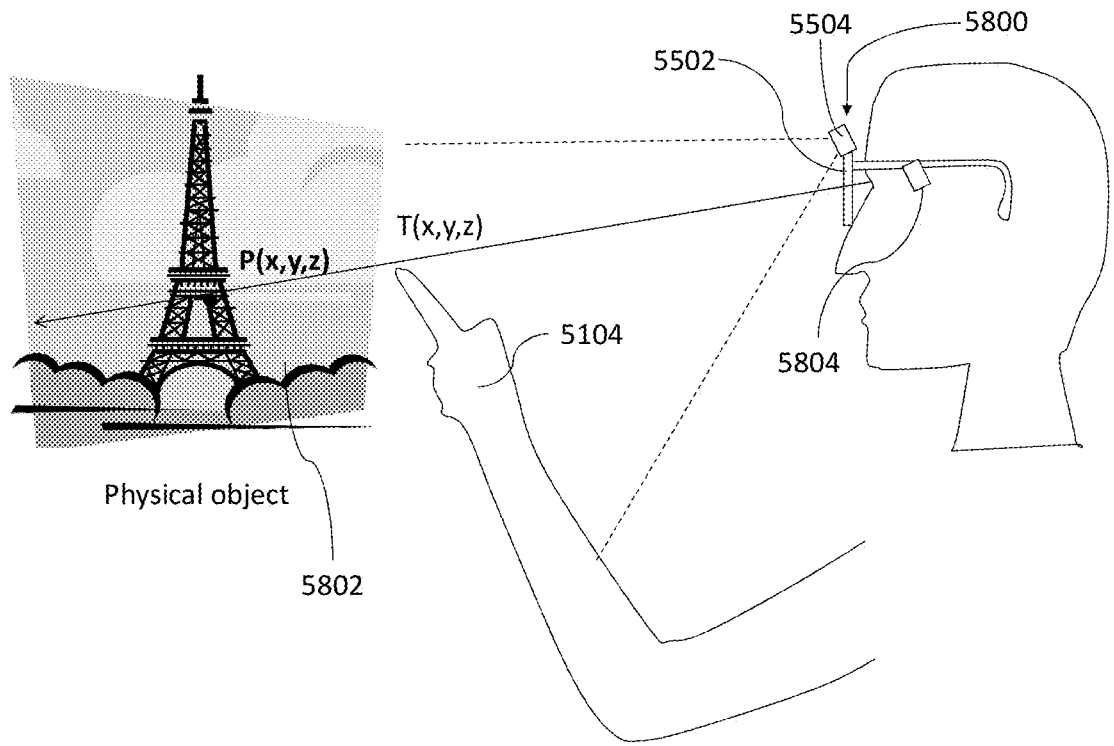
FIG. 58 shows an HMD system according to an exemplary embodiment.

FIG. 58 shows an HMD system 5800 with which the user may interact with a physical object 5802 that may locate at a distance far away from the user. The HMD system 5800 includes the HMD glasses 5502, the sensing device 5504, and a global positioning system (GPS) 5804. In some embodiments, the 3D position of the HMD system 5800 in a world coordinate system is detected, for example, by the GPS 5804. The 3D position of the user's eye in the word coordinate system, Ew(x,y,z), is calculated. The sensing device 102 detects the 3D position of the hand 5104 in the coordinate system of the sensing device 102, T(x,y,z), which is then converted by the HMD system 5800 to 3D position in the world coordinate system, Tw(x,y,z). A line extending from the user's eye to the 3D position of the hand is calculated in the world coordinate system. An intersection between the line and the physical object 5802 (the HMD system 5800 has recorded the 3D position of the physical object 5802 in the world coordinate system) is detected, and location information of the interaction is acquired and sent to the operating system or the applications.

Figure 59:
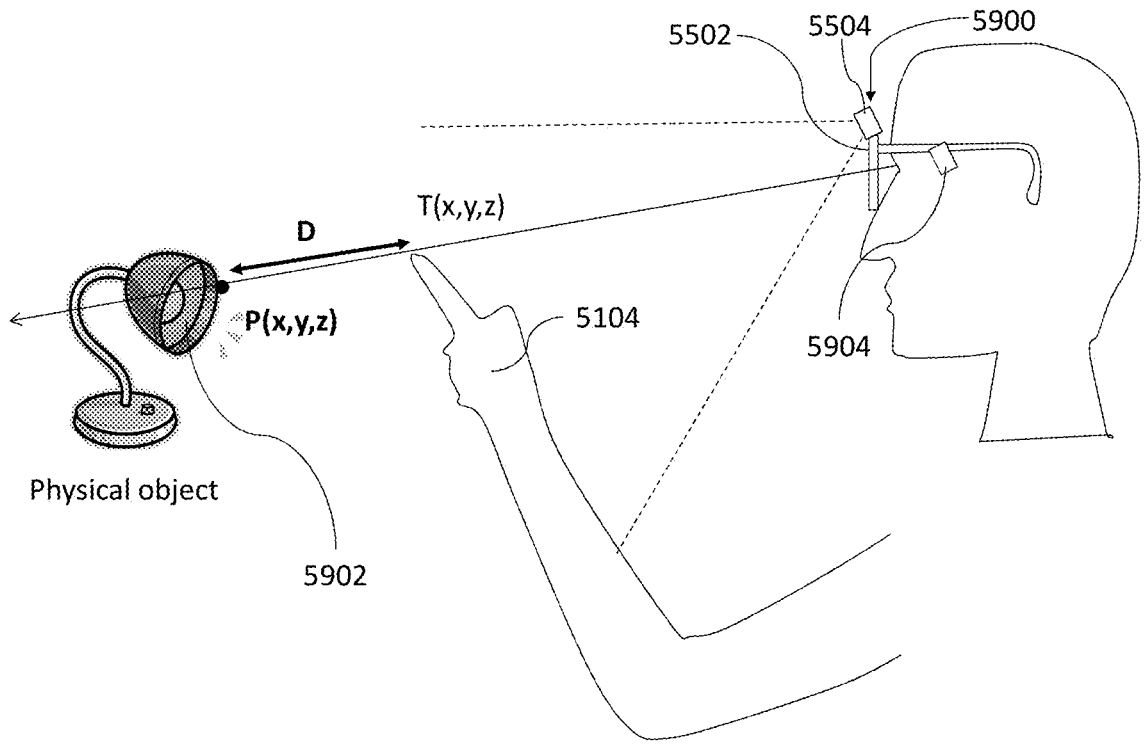
FIG. 59 shows an HMD system according to an exemplary embodiment.

FIG. 59 shows an HMD system 5900 with which the user may interact with a physical object 5902. The HMD system 5900 includes the HMD glasses 5502, the sensing device 5504, and a camera 5904. Consistent with embodiments of the disclosure, the HMD system 5900 uses the camera 5904 or another device to detect the physical object 5902 and calculates the 3D position of the physical object 5902 in the coordinate system of the HMD system 5900. The HMD system 5900 also detects the 3D position of the hand 5104, T(x,y,z), and calculates a line extending from the user's eye to the hand 5104, in the coordinate system of the HMD system 5900. The HMD system 5900 detects and calculates the 3D position of the intersection between the line and the physical object 5902 in the coordinate system of the HMD system 5900, P(x,y,z), and calculates a distance D between the 3D position of the hand to the 3D position of the intersection. The obtained information is sent to the operating system or the applications.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for three-dimensional (3D) sensing comprising:
obtaining a two-dimensional (2D) image of an object taken from a viewing angle;
extracting a 2D skeleton of the object from the 2D image, the 2D skeleton including a 2D skeleton line representing a section of the object, extracting the 2D skeleton including:
calculating probabilities of pixels in the 2D image being part of the section of the object;
locating the section of the object based on the calculated probabilities;

calculating, for pixels on a same scanning line in the section, a skeleton point of the scanning line by performing a weighted averaging on positions of the pixels on the scanning line using the calculated probabilities of the pixels on the scanning line as weighting factors; and obtaining the 2D skeleton line by connecting skeleton points on different scanning lines; and calculating a 3D skeleton of the object based on the 2D skeleton, the 3D skeleton including a 3D skeleton line representing the object.

2. The method of claim 1,
wherein the 2D image is a first 2D image of the object, the viewing angle is a first viewing angle, the 2D skeleton is a first 2D skeleton of the object, and the 2D skeleton line is a first 2D skeleton line representing the section of the object, the method further comprising:
obtaining a second 2D image of the object taken from a second viewing angle different from the first viewing angle; and extracting a second 2D skeleton of the object from the second 2D image, the second 2D skeleton including a second 2D skeleton line representing the section of the object, wherein calculating the 3D skeleton includes calculating the 3D skeleton line based on the first and second 2D skeleton lines.

3. The method of claim 2, further comprising:
associating a first 2D segment of the first 2D skeleton with a second 2D segment of the second 2D skeleton, the first and second 2D segments representing the section of the object; and comparing a 2D position of the first 2D segment and a 2D position of the second 2D segment to calculate a 3D position of the section.

4. The method of claim 2, further comprising:
projecting a previously-calculated 3D skeleton of the object to the first viewing angle to create a first projected 2D skeleton; and projecting the previously-calculated 3D skeleton to the second viewing angle to create a second projected 2D skeleton, wherein calculating the 3D skeleton includes calculating the 3D skeleton based on the first 2D skeleton, the second 2D skeleton, the first projected 2D skeleton, and the second projected 2D skeleton.

5. The method of claim 1, wherein calculating a probability of a pixel being part of the section of the object includes:
comparing a brightness distribution of a neighbor region of the pixel with a pre-defined template corresponding to the section; and calculating the probability based on how well the brightness distribution of the neighbor region fits the template.

6. The method of claim 1, wherein calculating a probability of a pixel being part of the section of the object includes:
fitting a brightness distribution of a neighbor region of the pixel with a light reflection model corresponding to the section; and returning a fitting score as the probability.

7. The method of claim 1,
wherein the object is a hand and the section is a finger trunk of the hand,
the method further including:
calculating a finger cylinder length of the finger trunk.

8. The method of claim 7, wherein calculating the finger cylinder length includes:
traversing, from a top point of the 3D skeleton line, down the 3D skeleton line, and to a traversing end point; and
calculating a distance between the top point and the traversing end point as the finger cylinder length.

9. The method of claim 8, wherein traversing to the traversing end point includes traversing to an end point of the 3D skeleton line.

10. The method of claim 8, wherein traversing to the traversing end point includes traversing to a point at which a difference between the 3D skeleton line and a straight line is larger than a threshold value.

11. The method of claim 8, further comprising:
calculating a finger direction of the finger trunk by calculating a direction of a line connecting the top point and the traversing end point.

12. The method of claim 7, wherein:
extracting the 2D skeleton further includes extracting a 2D skeleton position representing a finger tip of the hand, and
calculating the 3D skeleton of the object further includes calculating a 3D skeleton position representing the finger tip based on the 2D skeleton position representing the finger tip.

13. The method of claim 12, wherein:
the pixels are finger trunk pixels corresponding to the finger trunk,
the probabilities are finger trunk probabilities of the finger trunk pixels being part of the finger trunk,
extracting the 2D skeleton position includes:
calculating finger tip probabilities of finger tip pixels being part of the finger tip;
locating the finger tip based on the calculated finger tip probabilities; and
calculating the 2D skeleton position by performing a weighted averaging on 2D positions of the finger tip pixels using the calculated finger tip probabilities of the finger tip pixels as weighting factors.

14. The method of claim 1, wherein:
obtaining the 2D image includes taking the 2D image using a camera,
the 2D skeleton includes a 2D segment representing the section of the object, and
calculating the 3D skeleton includes:
calculating a distance from the 2D segment to the camera based on at least one of a width or a brightness of the 2D segment; and
calculating a 3D position of the section based on the distance.

15. A non-transitory computer-readable storage medium storing a program for three-dimensional (3D) sensing, the program, when executed by a computer, instructing the computer to:
obtain a two-dimensional (2D) image of an object taken from a viewing angle;
extract a 2D skeleton of the object from the 2D image, the 2D skeleton including a 2D skeleton line representing a section of the object, extracting the 2D skeleton including:
calculating probabilities of pixels in the 2D image being part of the section of the object;
locating the section of the object based on the calculated probabilities;
calculating, for pixels on a same scanning line in the section, a skeleton point of the scanning line by performing a weighted averaging on positions of the pixels on the scanning line using the calculated probabilities of the pixels on the scanning line as weighting factors; and obtaining the 2D skeleton line by connecting skeleton points on different scanning lines; and calculate a 3D skeleton of the object based on the 2D skeleton, the 3D skeleton including a 3D skeleton line representing the object.

16. An apparatus for three-dimensional (3D) sensing, comprising:

a camera configured to capture a two-dimensional (2D) image of an object from a viewing angle; and a processor configured to:

extract a 2D skeleton of the object from the 2D image, the 2D skeleton including a 2D skeleton line representing a section of the object, extracting the 2D skeleton including:

calculating probabilities of pixels in the 2D image being part of the section of the object;

locating the section of the object based on the calculated probabilities;

calculating, for pixels on a same scanning line in the section, a skeleton point of the scanning line by performing a weighted averaging on positions of the pixels on the scanning line using the calculated probabilities of the pixels on the scanning line as weighting factors; and obtaining the first 2D skeleton line by connecting skeleton points on different scanning lines; and calculate a 3D skeleton of the object based on the 2D skeleton, the 3D skeleton including a 3D skeleton line representing the object.

* * * * *